(12) United States Patent
Henkes et al.

(10) Patent No.: US 11,241,006 B2
(45) Date of Patent: Feb. 8, 2022

(54) MODULAR DEVICE AND SYSTEM FOR DETERRING BIRDS

(71) Applicant: Bird Control Group BV, Delft (NL)

(72) Inventors: Steinar Henkes, Delft (NL); Pim Tammes, Delft (NL); Bob van Haren, Delft (NL); Kris Mooi, Delft (NL); Anirudh Bisht, Delft (NL); Tim Sprang, Delft (NL); Robin Blok, Delft (NL); Haiyan Che, Delft (NL); Tomaz Rems, Delft (NL)

(73) Assignee: Bird Control Group BV, Delft (NL)

(*) Notice: Subject to any disclaimer, the term of this patent is extended or adjusted under 35 U.S.C. 154(b) by 145 days.

(21) Appl. No.: 16/413,818

(22) Filed: May 16, 2019

(65) Prior Publication Data

US 2020/0359616 A1    Nov. 19, 2020

(51) Int. Cl.
| | | |
|---|---|---|
| *A01M 29/10* | (2011.01) | |
| *A01M 31/00* | (2006.01) | |
| *A01M 29/32* | (2011.01) | |
| *G08B 21/18* | (2006.01) | |
| *G08B 1/08* | (2006.01) | |
| *G08B 21/00* | (2006.01) | |

(52) U.S. Cl.
CPC .......... *A01M 29/10* (2013.01); *A01M 29/32* (2013.01); *A01M 31/002* (2013.01); *G08B 1/08* (2013.01); *G08B 21/00* (2013.01); *G08B 21/18* (2013.01)

(58) Field of Classification Search
CPC ...... A01M 29/00; A01M 29/06; A01M 29/10; A01M 29/16; A01M 29/18; A01M 31/00; G05D 1/02; G05D 1/0219; H05B 37/02; H05B 37/0245; G01C 21/00; G01C 23/00
See application file for complete search history.

(56) References Cited

U.S. PATENT DOCUMENTS

| | | | |
|---|---|---|---|
| 6,181,261 B1* | 1/2001 | Miles, Jr. | G01S 3/7864 340/933 |
| 7,395,629 B1 | 7/2008 | Thomas | |
| 8,474,411 B2 | 7/2013 | Scott | |
| 10,863,668 B2* | 12/2020 | Chrysanthakopoulos | G05D 1/0219 |
| 2013/0063027 A1* | 3/2013 | Recker | H05B 47/105 315/86 |
| 2013/0298845 A1* | 11/2013 | Blanchard | A01M 29/08 119/713 |
| 2015/0008829 A1* | 1/2015 | Lurie | F21S 8/086 315/153 |
| 2018/0192631 A1 | 7/2018 | Noga | |
| 2019/0014770 A1 | 1/2019 | Henskes et al. | |
| 2020/0359616 A1* | 11/2020 | Henkes | G08B 21/00 |

FOREIGN PATENT DOCUMENTS

KR    101443199 B1    9/2014

* cited by examiner

*Primary Examiner* — Van T Trieu
(74) *Attorney, Agent, or Firm* — Barlow, Josephs & Holmes, Ltd.; Stephen J. Holmes

(57) ABSTRACT

The present disclosure describes a device which is able to detect and deter wildlife. The present solution provides for a modular system which can have various modules received in a module housing and those modules can be replaced without the need for the device to be serviced by the manufacturer or a certified repair technician.

18 Claims, 24 Drawing Sheets

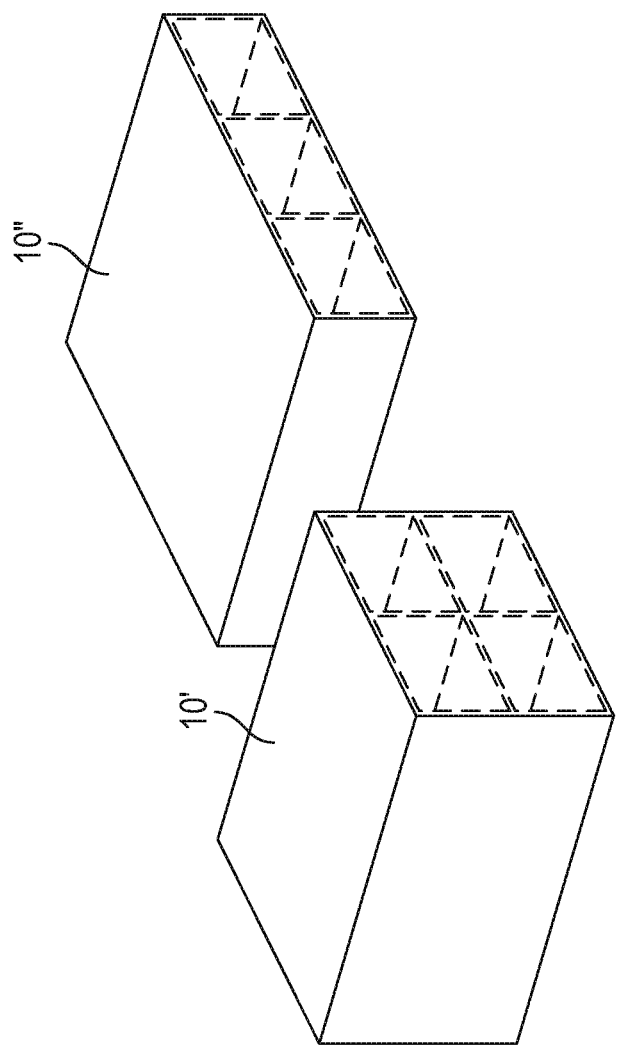
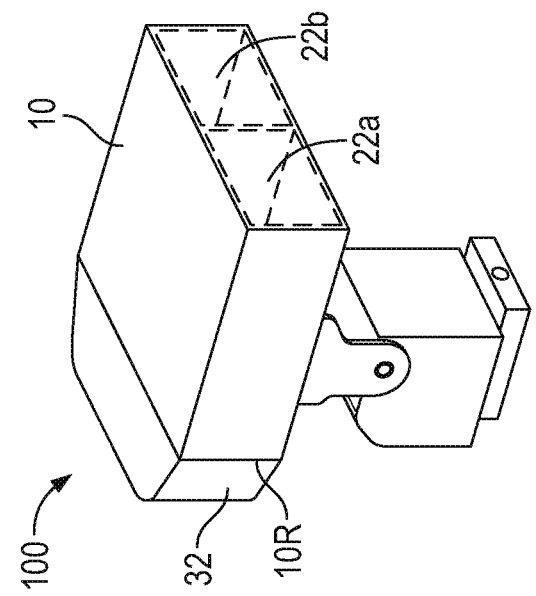
FIG. 1A

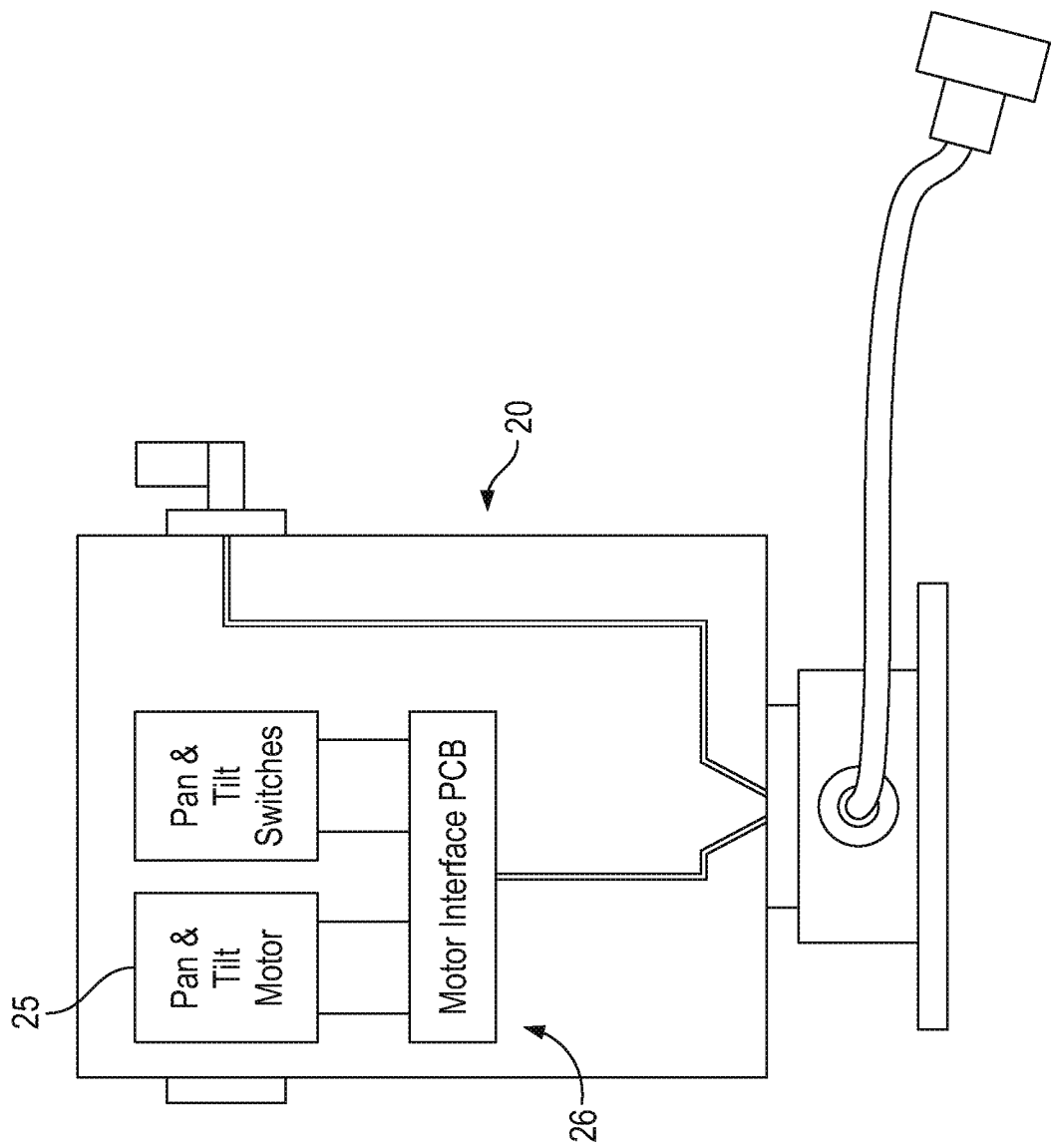

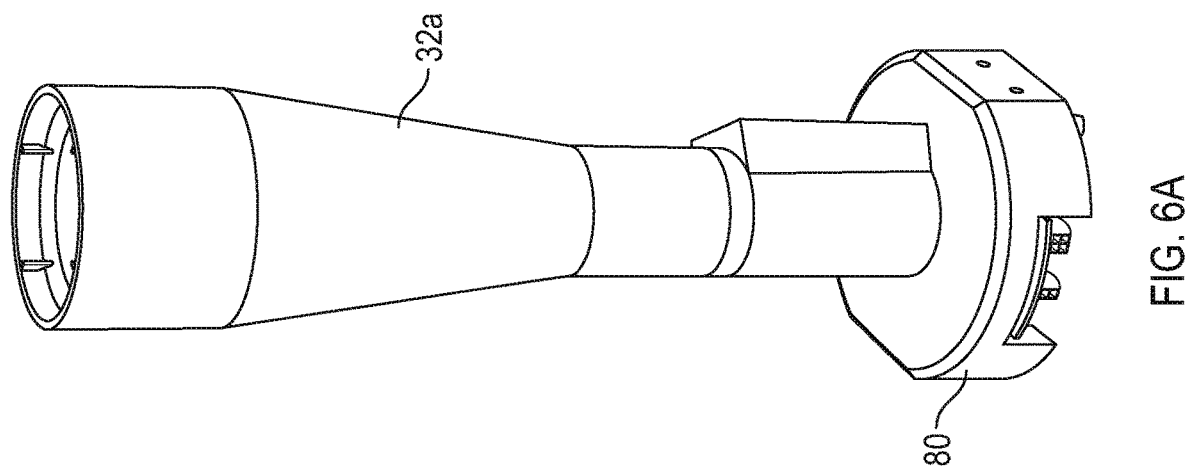

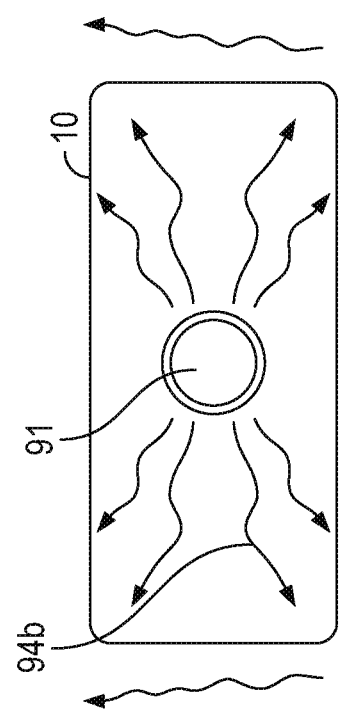

MODULAR DEVICE AND SYSTEM FOR DETERRING BIRDS

FIELD OF THE INVENTION

The present invention relates to a deterring method and device for deterring birds from an area to be protected such as farm land.

BACKGROUND OF THE INVENTION

Birds can be severely detrimental to large scale farming operations for a variety of reasons. As such, there are numerous devices, both passive and active, which have been developed to scare birds away. While passive devices may not need constant updates, birds may become accustom to them and the passive devices can lose their efficacy. Active devices similarly suffer from the need for updates if parts require replacing or if the birds become accustom to the type of deterrents used.

One such active device uses a camera and laser system that can be mounted on a movable, or stationary, base. Such a configuration often requires repairs and upgrades which must be performed by the original manufacturer. Further still, existing devices are not built in a modular way. Currently, the process of replacing a specific part of the device is a complex and time-consuming process which can take, on average, 0.5-2.0 hours. Take for example a laser module. The average lifetime of the laser is a lot shorter than the average lifetime of the remaining components. Comparable with a traditional light bulb or a lamp of a beamer, the laser module has limited amount of 'burning hours', after which the module needs to be replaced. When the laser is end of life the remainder of the device often still functions correctly. The operational lifetime of the product can be expanded by allowing the laser to be replaced as an individual module. Current devices need to be physically shipped back to a service center of the original manufacturer or a certified service provider. Upon receiving the device, the laser module can then be replaced by an experienced engineer, who will require a large and diverse set of tools and a workshop which is prepared for this specific maintenance task. Replacing the malfunctioning laser will take up at least half an hour. After laser replacement, the device will need to be shipped back to the end user, where it can be installed again. This procedure causes many restrictions on current devices. The end user will experience significant downtime during the return and repair process. When a device stops working, the whole unit needs to be sent back for inspection before getting replaced. This means the client loses his or her device for an extended period of time. If an individual module can be replaced in the field by the client, this will dramatically reduce device downtime. Generally, when the laser reaches its end-of-life the user's only option is an RMA for replacement parts. This means that the company needs to invest resources in shipping, inspecting, and repairing a device. If an individual module can be replaced in the field by the client, this can result in reduced costs for both manufactures and users. System upgrades are currently not possible for an end user client to complete. In those specific cases, upgrading can only be done by buying a new device. No parts are currently interchangeable between different products, meaning that many different products and/or replacement parts need to be in stock.

During inspection of a return or repair, the sensitive electronics components of the device are exposed to external influences, which can include contaminants. This creates a risk of parts being unintentionally damaged during inspection and/or replacement. Alignment of the laser module is different for each product due to manufacturing tolerances or inaccuracies. Additionally, mounting methods have slight variations based on the inaccuracy and preferences of the engineer assembling the product.

As a result, there remains a need for a modular bird control system which can be upgraded and repaired in the field by an end user to reduce costs and down time.

SUMMARY OF THE INVENTION

According to an aspect of the present application, a device is provided which is modular to allow for many combinations of modules. The present disclosure additionally provides the possibility to easily implement and add a new module, after the device has been completely manufactured and during the device lifetime. Such a configuration provides many opportunities to improve and adapt the system, to include future developments or technological innovations without the need to fully replace the system. Additionally, this would also allow for additions based on individual customer requirements or feedback from third parties. The instant modular device provides a versatile modular interface, which is capable of connecting existing and also future modules together. While, the main function of the device is its use as a bird dispersal system by means of a light source, such as a laser, the modular approach allows the device to be used for different purposes, with or without a light source. A second, or alternative, main function of the device is its use as a detection system, for example to detect birds or other pests.

The following is a listing of various advantages which can be achieved with the instant application. The listing of advantages is not intended to be limiting or exhaustive.

The modular device disclosed herein provides for modules which can be easily replaced. Such a device can provide numerous benefits surrounding maintenance, including:

a saving on assembly time;

the device can prevent a user from connecting the modules the wrong way around, mismatch the pinout, or incorrect wiring;

the time to perform replacement or exchange of modules is short;

the resulting downtime can be relatively short and the time or cost for operator is low (minutes instead of hours);

the possibility of causing damage to other parts is reduced if not eliminated; and/or there is an improved operational lifetime of for the overall device and system due to new maintenance options.

Such a device can provide numerous benefits surrounding the communication system, including:

modules can contain their own control unit and can operate as independent device;

the control logic for a light source or laser diode can be contained within the module itself so that a breakdown or upgrade means only replacing the module on site and the electronics at the manufacturer instead of changing the entire system;

the device can provide a better communication platform for troubleshooting and/or system logging; and/or the device can provide for possibilities to implement communication features for the end user and or manufacturer.

Such a device can provide numerous benefits pertaining to manufacturing, including:

the shipping costs of a small lightweight box with a single module instead of an entire device in case of replacement/exchange;

one-time development costs, as the rest of the device does not need to be changed when new modules are added;

module updates apply to different products at the same time. This means that hardware improvements can be implemented in the complete product range while only one module has changed;

ordering of modules from suppliers can have less associated risk to supplies, as modules can be used in a multitude of products and thus makes the possibility of having excess stock smaller;

can provide for added product consistency.

The instant modular device can provide additional versatility, for example:

modules can be used to build different kind of systems;

products can be tailored to the customer's needs;

if the user's requirement change it is possible to simply replace the module (e.g. laser module with higher output power, motorized module with higher precision).

BRIEF DESCRIPTION OF THE DRAWING FIGURES

FIG. 1A is a perspective view of a bird deterrence device according to various embodiments of the invention;

FIG. 2 is a schematic view of an exemplary motor platform of the bird deterrence device of FIG. 1A;

FIGS. 6A & 6B show perspective views of an exemplary adapter;

FIGS. 10B-10D show schematic views of the heat transfer in the laser module of FIG. 10A;

DETAILED DESCRIPTION OF THE EXEMPLARY EMBODIMENTS

Figure 1B:
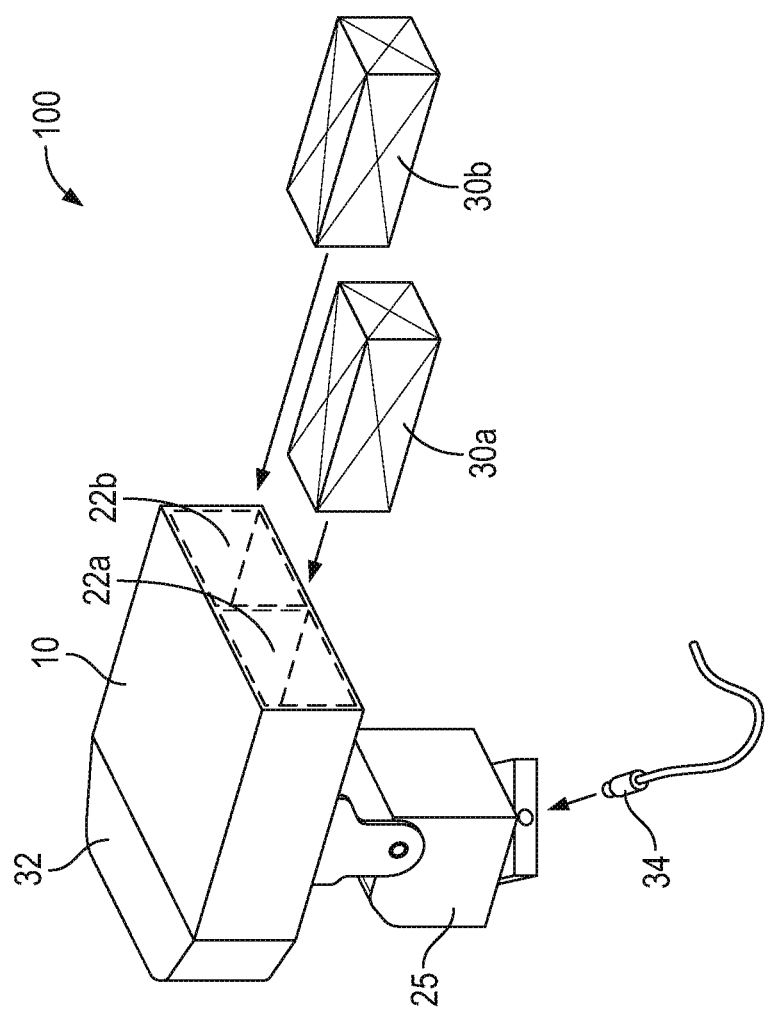
FIG. 1B is a perspective view of an exemplary device of FIG. 1A including two modules.

Unless otherwise defined, all terms (including technical and scientific terms) used herein have the same meaning as commonly understood by one of ordinary skill in the art to which this invention belongs as read in the context of the description and drawings. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some instances, detailed descriptions of well-known devices and methods may be omitted so as not to obscure the description of the present systems and methods.

Throughout the application, any function for carrying out the disclosed methods, in particular, as further clarified below: a receiving function; defining function; transforming function; and activating function is implemented in hardware and/or software and as structurally identifiable by the function it performs in the system; i.e. the function is physically implemented in hardware and/or software or information structures transmitted through the network. The function may be implemented by dedicated processing circuitry that processes input data read from system resources. These functions may be executed by one or more processors configured to perform operational acts in accordance with the present systems and methods, such as to provide control signals to the various other module components. The processor may be a dedicated processor for performing in accordance with the present system or may be a general-purpose processor wherein only one of many functions operates for performing in accordance with the present system. The processor may operate utilizing a program portion, multiple program segments, or may be a hardware device utilizing a dedicated or multi-purpose integrated circuit. This also covers combinations of hardware and software, for example: a micro-controller sending a PWM signal to a motor driver to control a speed of the motor. Any type of processor may be used such as dedicated or shared one. The processor may include micro-controllers, central processing units (CPUs), digital signal processors (DSPs), ASICs, or any other processor(s) or controller(s) such as digital optical devices, or analog electrical circuits that perform the same functions, and employ electronic techniques and architecture. The controller or processor may further comprise a memory that may be part of or operationally coupled to the controller. The memory may be any suitable type of memory where data is stored. Any medium known or developed that can store and/or transmit information suitable for use with the present systems and methods may be used as a memory. The memory may also store user preferences and/or application data accessible by the controller for configuring it to perform operational acts in accordance with the present systems and methods.

The invention is described more fully hereinafter with reference to the accompanying drawings, in which embodiments of the invention are shown. This invention may, however, be embodied in many different forms and should not be construed as limited to the embodiments said forth herein. Rather, these embodiments are provided so that this disclosure will be thorough and complete, and will fully convey the scope of the invention to those skilled in the art.

The description of the exemplary embodiments is intended to be read in connection with the accompanying drawings, which are to be considered part of the entire written description. In the drawings, the size and relative sizes of systems, components, layers, and regions may be exaggerated for clarity. Embodiments are described with reference to schematic illustrations of possibly idealized and/or intermediate structures of the invention.

FIGS. 1A-2 show a schematic arrangement of a bird deterrence device 100 according to an embodiment of the invention. A module housing 10 is constructed to be fixed relative to an area to be scanned. The module housing 10 is typically a fixed construction, for example, placed on a support in a designated area, or fixed to a building; to provide for an accurate scanning of the area. The module housing can provide one, two, or more openings 22a, 22b, for individual modules 30a, 30b, 32, as will be discussed below. Alternatively, a module housing 10', 10", can have four, three, or more openings. Alternatively, as shown in FIGS. 1A-2, an actuator platform 23 can be provided which can be actuated to pivot and rotate the module housing 10 as required. The platform 23 can provide for the module housing 10 to be mounted, depending on specific dimensions, several decimeters or meters above the ground. The module housing 10 can be rotated or tilted by the actuator 25, for rotating the module housing at designated lateral and elevational angular speeds relative to the normal axis, further illustrated in FIG. 2.

Figure 1C:
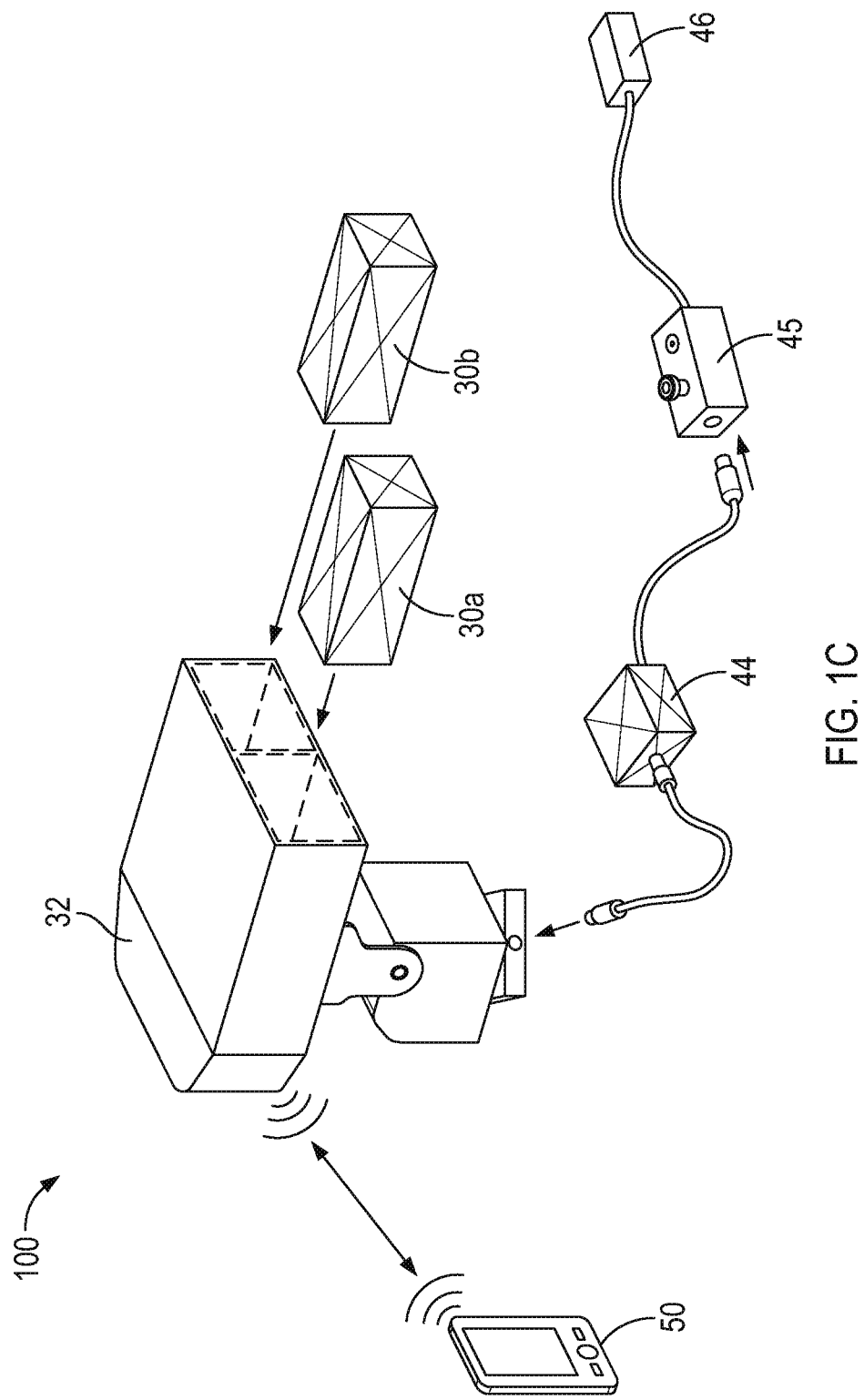
FIG. 1C is a perspective view of another exemplary bird deterrence device.

Conveniently a power supply 46, can be provided for feeding the device 100 through a connector cable 34. The power supply 46 can be provided with a battery unit and solar panels, but naturally, also net power supply, wind turbine or fuel generator may be feasible. Further still, the power supply can provide parallel redundant power and communications as will be discussed further below. A master module 32 can be attached to the module housing 10 that controls the system 10. The master module 32 can be provided with a sensor 44 and emergency switch 45 to prevent a hazard. The sensor 44 and switch 45 are connected between the power supply 46 and the master module, as shown in FIG. 1C. The sensor 44, switch 45, and power supply 46 can be hardwired together or have electrical connectors disposed there between to allow for individual components to be replaced or disconnected. The device 100 can additionally, or alternatively, be configured to be operated by a wireless device 50, which can control one or more devices 10. FIG. 2 shows a more detailed view of scanning actuator assembly 20 which is mounted on the platform 23. In an exemplary embodiment the device 100 can be operated to be actuated by pan and tilt motors 25 arranged to direct the device in designated lateral and elevational angles; the pan and tilt motors 25 can be controlled by the master module 32. Angular control of the device 100 can be done or enhanced by additional sensors/hardware for higher accuracy. For example: motor/axis encoders (absolute, absolute multi-turn, binary) or a stepper motor. The device 100 can accordingly be rotated, thereby rotating the module housing 10 at designated lateral and elevational angular speeds relative to the normal axis. In a further alternative embodiment, the scanning equipment may be formed by a suitable grip for handheld applications.

Figure 3:
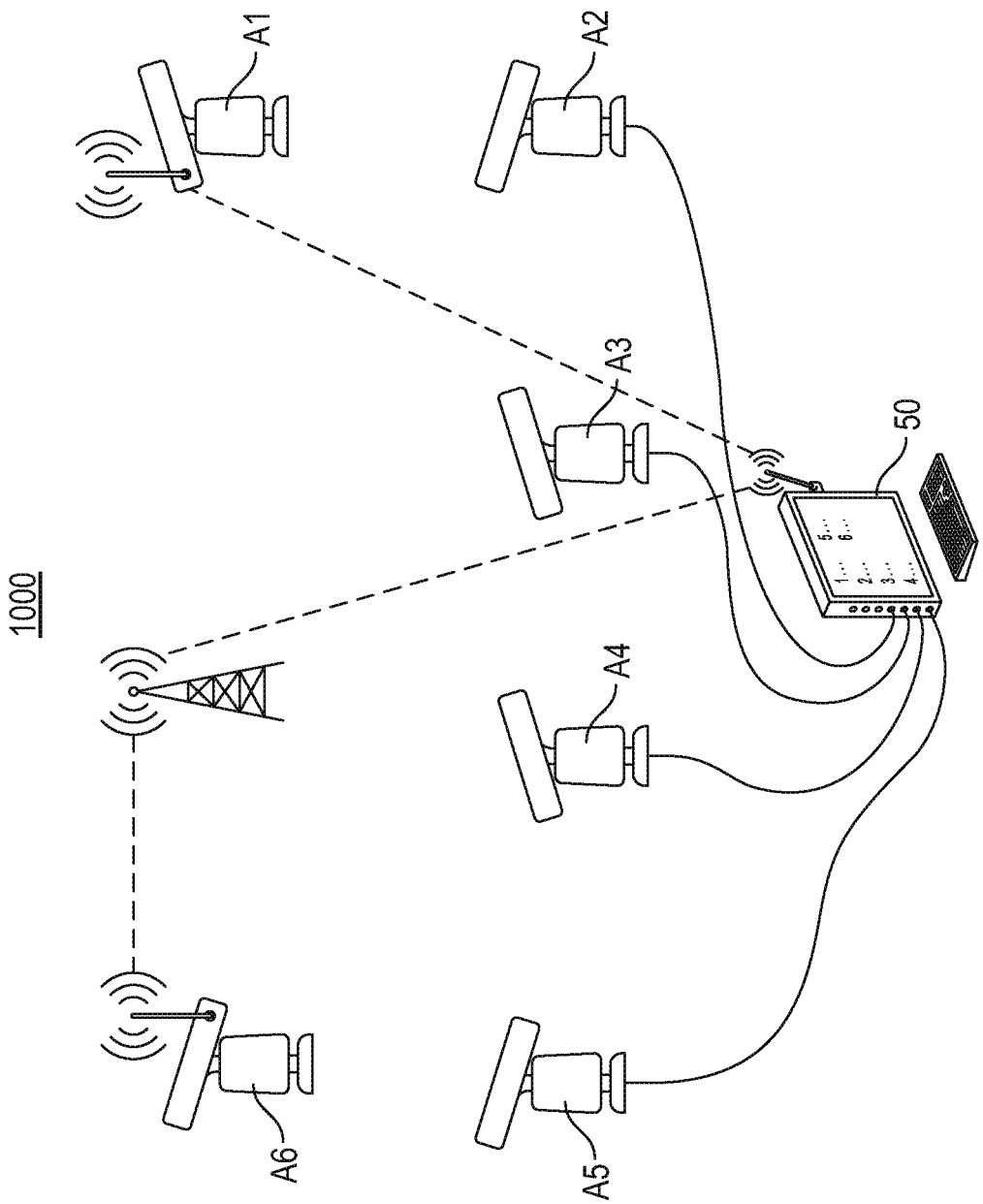
FIG. 3 is a schematic view of a networked bird deterrence system having a plurality of individual devices.

In the context of bird detection and control at a farm, one or multiple devices (100) A1-A6 can be connected to a monitoring module 50, as shown in at least FIG. 3, to create a bird detection and control network system 1000. The multiple devices (100) A1-A6 can be similar or the same as the device 100, shown in FIGS. 1A-1C. The remote monitoring module 50 can read, and store, status updates from all devices (100) A1-6 in the network system 1000. An operator can then be able to monitor all connected devices (100) A1-A6 from one single location. The devices (100) A1-A6 and monitoring module 50 can also be equipped with a wireless or cellular network connection, so the operator can receive a push notification when one of the units reports an error. In one alternative embodiment, the monitoring module 50 can function as a remote control for the connected devices to let the operator remotely turn on and off the device. In the instant configuration, the multiple devices (100) A1-A6 can, advantageously, be connected to a single monitoring/remote control module 50. A monitoring module/control module 50 can for example be used at an airport, where it is critical to be able to immediately shut down the devices (100) A1-A6 when there is an emergency situation or a critical device error. Also at large farms with multiple devices 100 it is possible to remotely shut down the devices 100 that project onto a certain part of the field.

In addition to the devices 100 accommodating network like functionality, the device 100 can accommodate various needs of the end user through the use of a universal module interface. In an embodiment where a plurality of devices 100 A1-A6 are networked together, the networked system 1000 would allow each device 100 to be modified as needed for the particular location with any of the various modules 30 discussed below. Such an interface allows for the aforementioned advantages over prior art systems which require costly repairs or upgrades.

Figure 4:
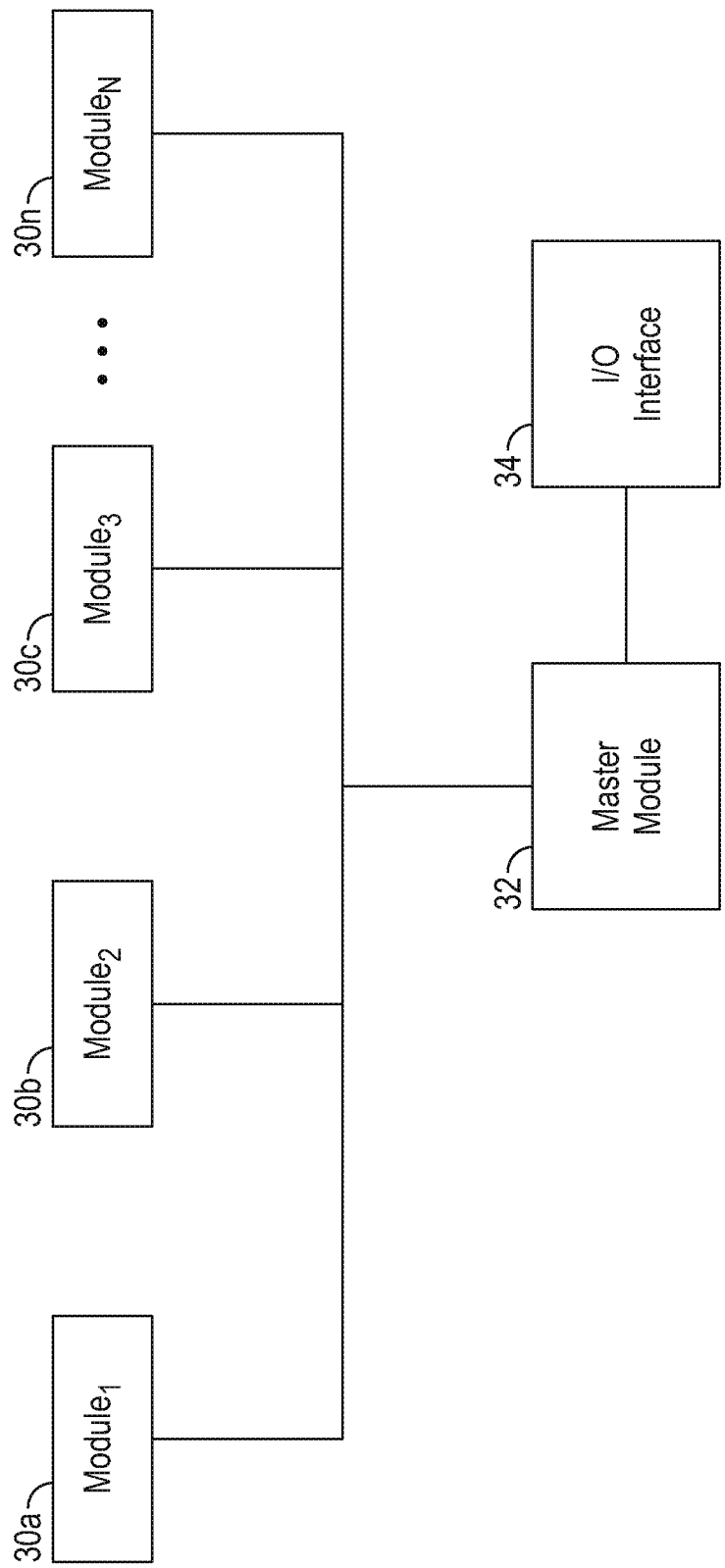
FIG. 4 is a block diagram of an exemplary bird deterrence device.

In one embodiment, a single modular device 100 can include an electrical connection can be provided to connect the various modules 30a, 30b. As shown schematically in FIG. 4, the master module 32 can be configured to connect, or locally network any number of modules 30a, 30b, 30c, . . . 30n. The electrical connection 34 can consist of one or more power supplies and one or more communication busses, connecting different modules in the system, using a single cable and a standardized connector, as will be discussed further below. One of the modules is a master module, or master 32. The master module 32 can be responsible for initiating communication between the one or more additional sub-modules, or slave modules 30a-30n. The other modules 30a-30n are slaves, which means they can only receive messages and answer messages addressed to them. In certain applications, a device 100 with multiple master modules 32 may be beneficial, where two or more masters 32 have the possibility to initiate communication.

The master module, or controller, 32 can be located in the rear cap 10r of the module housing 10 adjacent to the communication bus. In an alternative embodiment, the master module 32 can be disposed anywhere on the module housing 10, or even remote from the module housing 10. Each additional module 30a-30n is a slave and exclusively answers the questions, or commands, of the master module 32. In the exemplary embodiment, the order of communication is: master->slave->master. A message can be passed between the master module 32 and the slave(s) 30a-30n and can be defined in a so-called protocol definition and is defined for every module. A slave module 30a-30n can, however, be a master in its own sub-network, delegating tasks given by its master. For example, when a PC, smart phone, or tablet is connected to the device 100 (using USB, BLUETOOTH, BLUETOOTH LE, wired or wireless connections) the main controller 32 can act as a slave to the PC but remains the master within the context of the module housing 10. Due to this delegation relationship and local self-control, each module 30a-30n can perform its own task and be responsible for it while the main controller merely keeps general control and overwatch over the entirety of the machine. While the master controller 32 at the same time is also a master within the context of itself. The master control unit 32 can act as a master to all the modules while also being master of other peripherals on the printed circuit board (PCB) on different communication busses. In some embodiments, the device 100 can be multi-master where some of the modules 30 are masters as well in the sense that they can initiate communication with the main controller. Such a configuration can be accomplished using a full-duplex or half-duplex communication method.

Figure 5A:
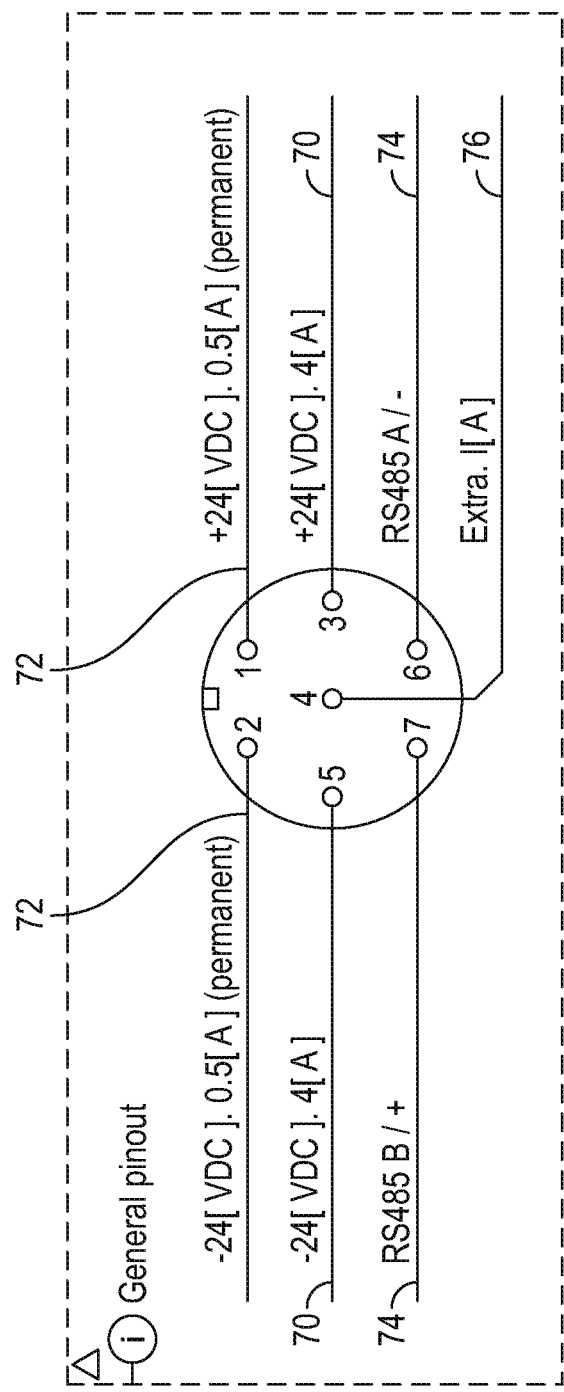
FIGS. 5A & 5B show schematic views of the electrical connector of the module housing of FIGS. 1A-1C.
Figure 5B:
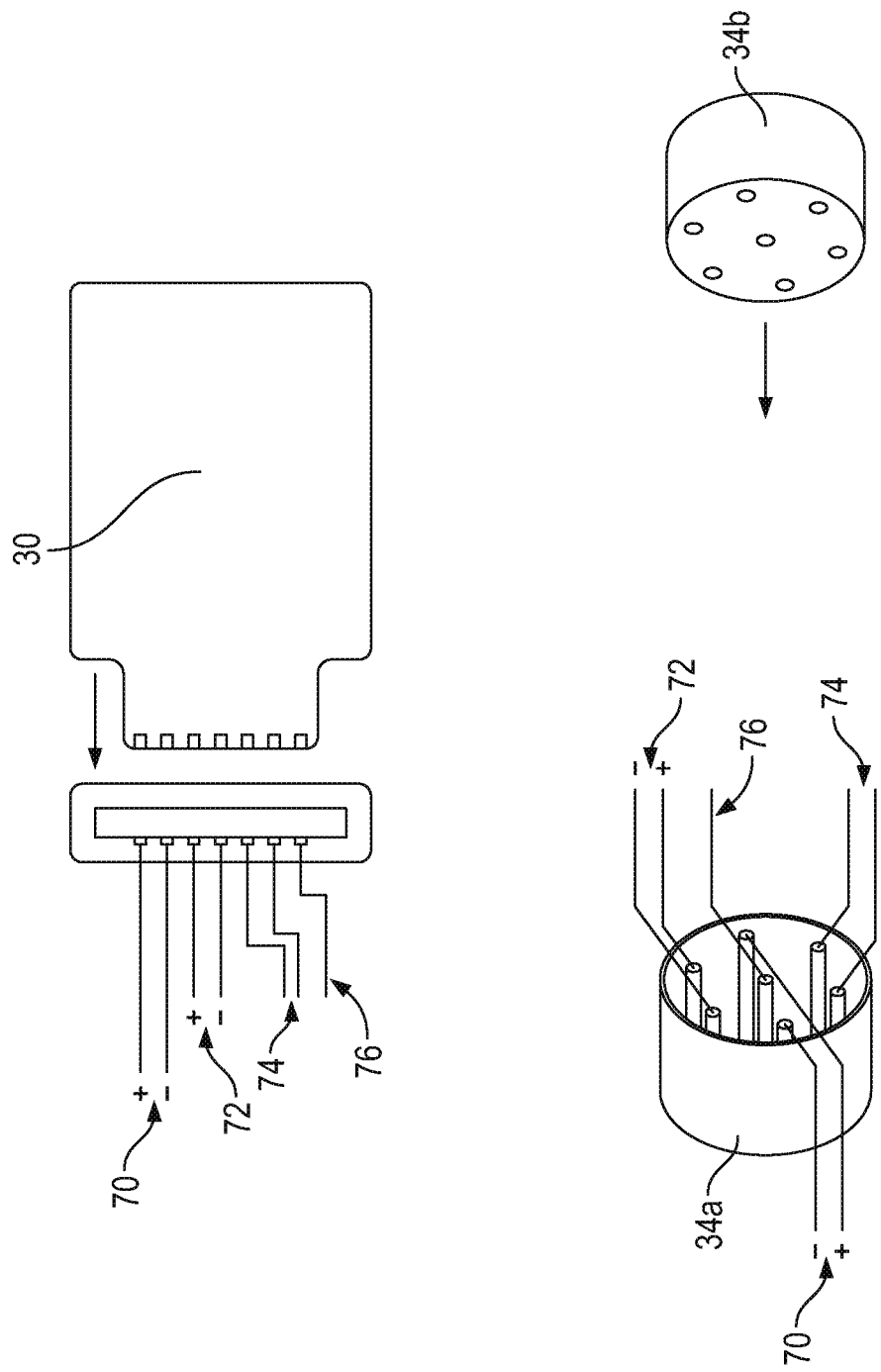

The master module 32 can provide for a multiple power connections 70, 72, as shown in FIGS. 5A & 5B, which can allow the system to cut the main power 70 when, for example, the device 10 enters power saving mode or an emergency stop is initiated. The secondary power connection 72 allows the modules 30a-30n to communicate with each other in order to let the master control module 32 or a (remote) operator retrieve the status of the device and its modules. This allows the safety system to intervene and cut the main power to the device but maintain power on the controllers of the device. The advantage is that the device 100 is still capable of communication but is unable to move or enable laser output, thus preventing any potential hazardous situation. In such a situation, an operator can be notified of the system error because of the separate power rails designed in the modular system.

In the illustrated embodiment, the multiple power connection be in the form of a pinout interface, generally shown in FIG. 5A. The pinout interface is shown in FIGS. 5A & 5B. Pin 1 and 2 provide the permanent secondary power 72. These pins 72 can provide 24V and are limited to 0.5 A. Pin 3 and 5 provide the main power 70 of 24V, limited to 4 A. Pin 6 and 7 are used for communication 74. Pin 4 is available for additional uses 76. Alternatively, any of the pins can be used for any purpose. There is a separation in permanent (secondary) 72 and main power 70 in order to achieve two things. First, the separation can be used to turn off any actuators (laser, ptu, . . . ) in a 'emergency' situation while having the possibility for the controllers to still function and understand this situation and be able to communicate or possibly even solve the situation. Secondarily, the separation can be used to be able to turn off any 'heavy consumers' in order to save power while the controllers remain alive and have the possibility to restore the main power when needed.

In some embodiments, multiple communication busses can allow the device 100 to communicate with different entities in different priorities, for example inform the user while maintaining contact with system critical parts. At the same time, multiple communication busses would allow for different entities to be used alongside each other if they use a different electrical interface or use a protocol which could cause a conflict. Communication 74 in the module housing 10 can occur through an RS485 interface, half duplex and at a specified baudrate. A custom designed and dedicated protocol is used to communicate between the master and the external modules. Alternatively, the use of other protocols would also be possible to establish communication. Within a single module 32a-32n, various interfaces like I2C, U(S)ART, SPI can be used, and the protocols can be dependent on the manufacturer of those parts.

Each module 30a-30n in the device 100 can be a self-contained unit, which can perform its tasks independently. The master module 32 would only has to give a command to operate, the (slave) unit 30a-30n can then take the necessary steps to execute the command. This means the master 32 is only busy with managing all operations of the device 100, while each unit (module) then only has to execute its task. No individual module 30a-30n has to pay attention or switch to any other task than its own task. As a result of the modules 30a-30n operating independently, it is also possible to integrate devices and modules from other manufacturers, with the master unit 30 acting as a hub, connecting all the different modules 32a-32n. The device 100 can then provide a modular connection interface and a communication platform towards external devices and modules.

Figure 6B:
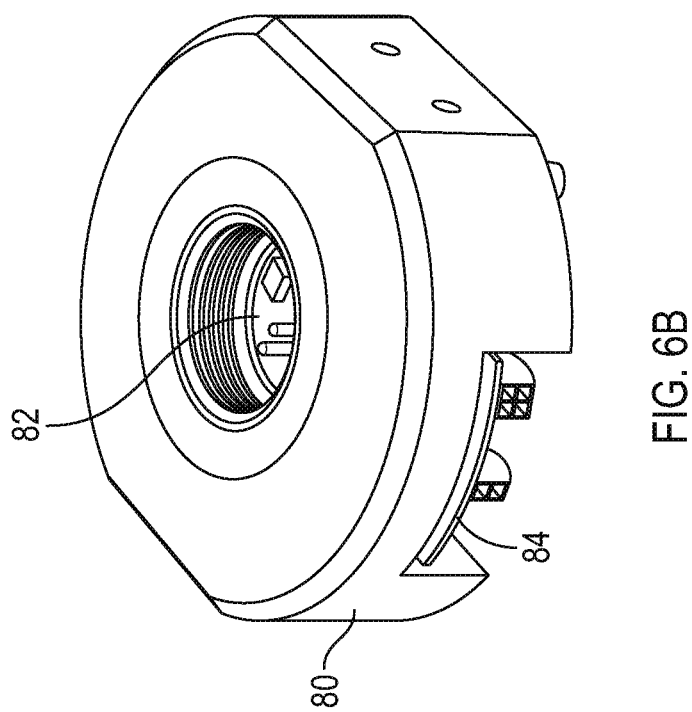
Figure 7:
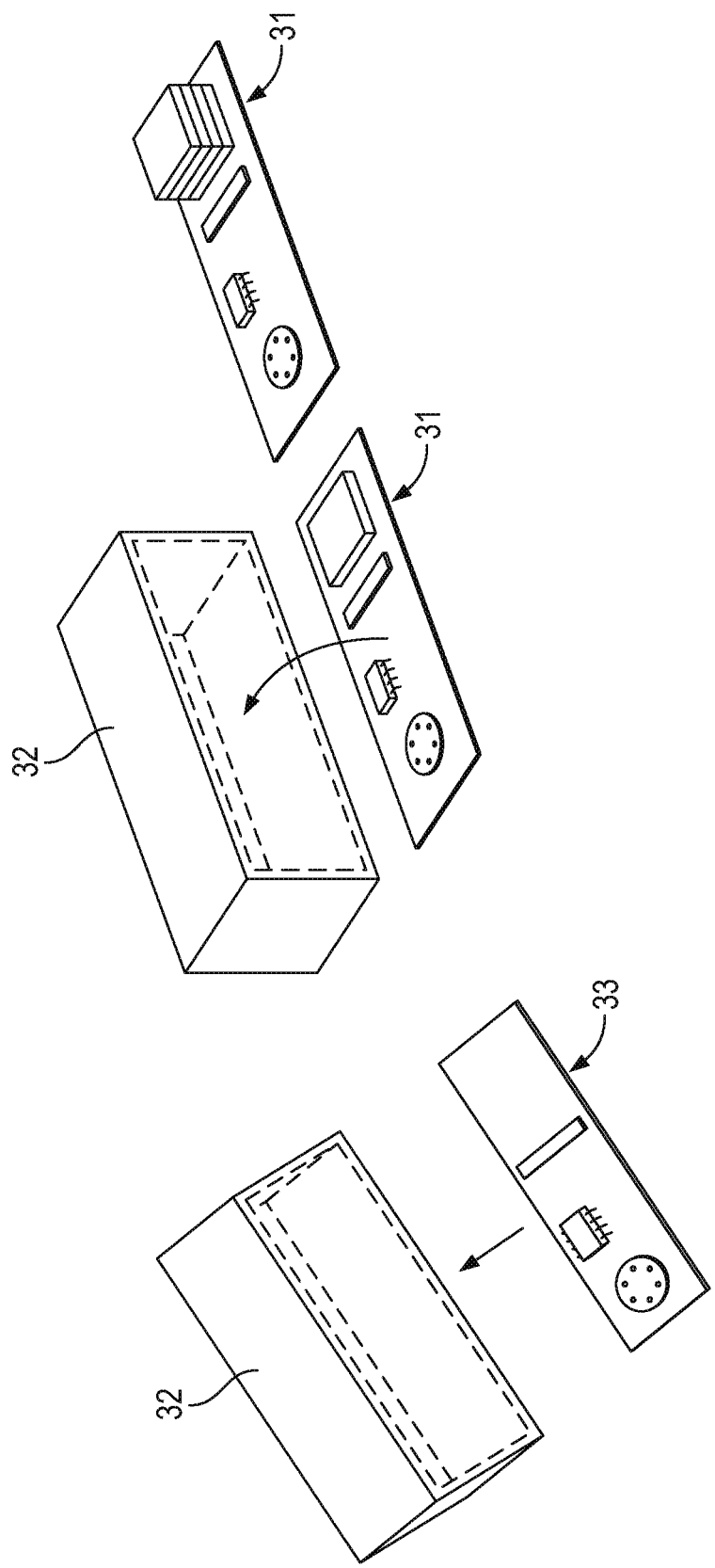
FIG. 7 shows a perspective view of upgrades for the master module.

As noted above, each module 30a-30n in the device 100 can be self-contained, this also means it can be operated outside of the modular device or module housing 10. By providing an adapter 80, as shown in FIGS. 6A & 6B, it is possible to connect the communication bus in the electrical interface of that specific module 30 to a port on a regular computer, handheld, tablet, or smart phone—not shown. The adapter 80 can additionally provide the necessary port 82 to connect external power to the power supply in the electrical interface of that module 30a.

The adapter, as shown in FIG. 6B, can allow a user to control a module 30 by a regular computer, not shown, through a connector 84, as a master for communication, in order to, for example, test or configure the particular module 32a, for example a light source (laser) or a camera. The main body of the adapter 80 can include a threaded through hole 82 to receive the pin connector of the module 30a. This means that each module 32a can be operated and configured while being outside of the main device 100. During the manufacturing and assembly process, this interface adapter 80 can save a lot of time and creates flexibility since there is no dependence on the larger device as the module can function by itself. Additionally, in the field or at a reseller valuable time can be saved as each module 30a-30n can report its status and log files or settings can be changed on the spot. Parameters could, for example, be set to work with a particular device as installed at the client without the need to have access to that device prior to shipping. The client then additionally has to add the module to the device 100 and everything is already set up correctly. Further, log information can be retrieved from a given module 30a-30n (at the manufacturer, a reseller of in the field) and processed on the spot or sent to the manufactures for analysis without the need for the manufacturer to have the module 'in hand'. Since the application firmware running on each module 30a-30n can be upgraded though its communication interface there is no need to open up the module 30a-30n in order to upgrade the firmware. Further still, each module 30a-30n can, for example, receive the latest firmware within a few minutes just before it's sent out to a client.

The communication bus itself allows for firmware updates to be sent towards each of the connected modules 30. The bus can be connected to any of the modules 30a-30n attached to the system 100. A firmware update can then be sent to the desired module 30a-30n from a micro-controller, which acts as the master controller in the network. A firmware update can also be sent from a regular computer via an adapter 80 or wireless connection. This allows for performing firmware updates in the field on each device 100 in a complete networked system 1000, as well as on individual modules 30 during testing or an RMA.

Furthermore, the communication bus allows any master 32 to receive a status update from any of the attached modules 30a-30n (slaves), regardless of where the master 32 and module 30a-30n are connected in the device 100 (daisy-chaining) or networked systems 1000. Using an adapter 80 or wireless connection, it is also possible to request the status of an individual module 30a-30n on a computer.

As discussed above, the inter-modular interface 34 can consists of at least four wires: two main power 70 and two communication 74 wires. Secondary power connection of two wires 72 can be added when it is desired that the module 30a-30n keeps communicating in error state. A seventh wire 76 can be present in the connector interface for additional functionality. The seventh wire 76 can be available for use in future upgrades, for example. The power leads (both main and secondary) 70, 72 supply the unit with 24V power. The secondary power 72 can be limited to 0.5 Ampere and the main power is limited to 4 Ampere. Most modules 30a-30n are able to operate on a lower voltage, so a system on 24V, 12V or 9V would also be possible to better allow for a solar powered system.

The device 100 is built in such a way that modules 30a-30n can be added or changed at various physical locations in the device 100. Module housings 10 are designed such that they can be mounted on an actuation platform 23 and can contain different types of modules 30 inside that can be interchanged. The master control module 32 can have several slots on a cover 33 for connecting additional (smaller) modules 30 for expansion. For example, one upgrade 31' or three upgrades 31", or more can be added to the control module 32. Such upgrades can be placed in the housing 31 or on the control module 32 directly. It is also possible to hook up additional modules to the wired connection that lead towards the main control module 32. A wireless connection between modules 30 is also possible. The wireless connection can be restricted to use to change device settings with an external operator device, for example a phone or a computer 50. It would also be possible to connect a connector hub to the system, providing multiple connectors at once to multiple modules and/or external devices 50.

In general, the various modules can be disposed within a module housing configuration. For example, as shown a module housing can be provided having two, four, or more slots for individual modules 30. Multiple configurations of the module housing 10, as shown in FIG. 1A, can be configured according to the needed number of connected modules 30. In one exemplary embodiment, the module housing can have two standard slots 22a, 22b. The slots 22a, 22b can be used for a light source module (such as a laser) 30a and one reserved for future upgrades 30b, as shown in FIG. 1B for example. Upgrades 30b-30n can also be mounted externally to the module housing 10 and/or externally between the actuation module 25 and the emergency stop 45.

Figure 8A:
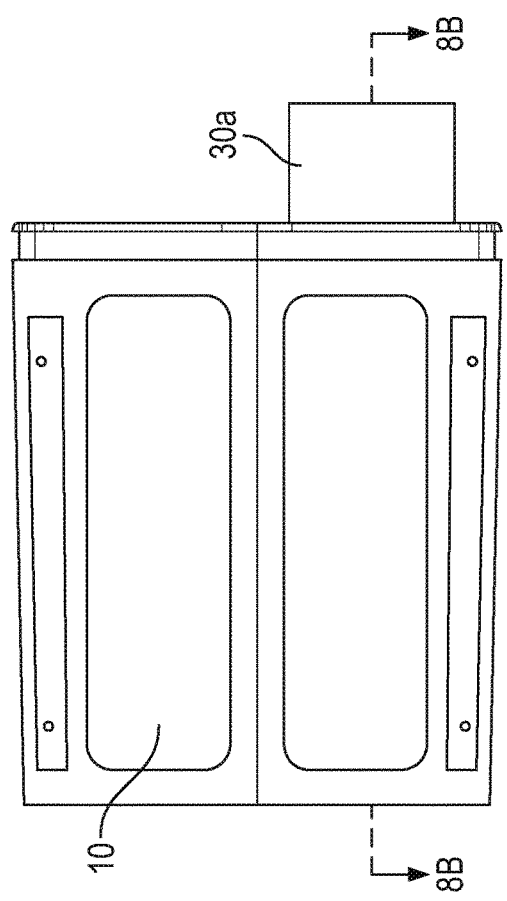
FIG. 8A is a top view of an exemplary module housing.
Figure 8B:
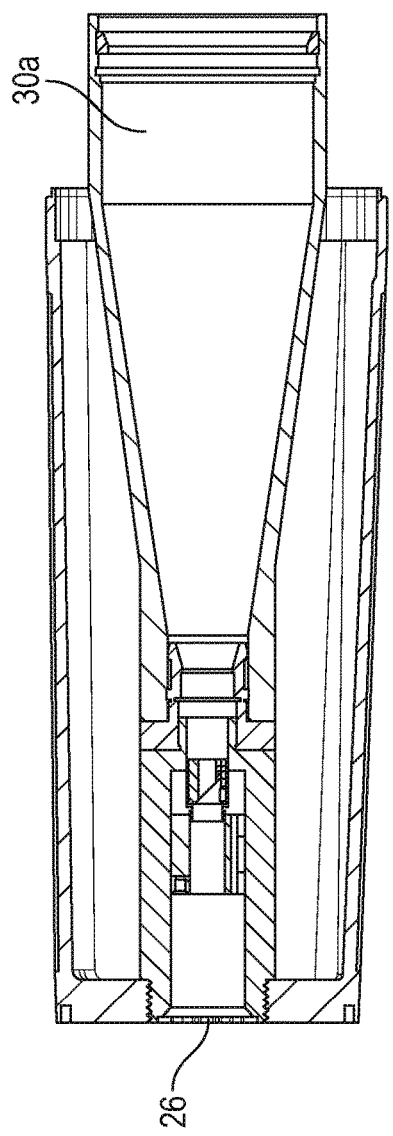
FIG. 8B is a cross-sectional view of the module housing of FIG. 8A.
Figure 8D:
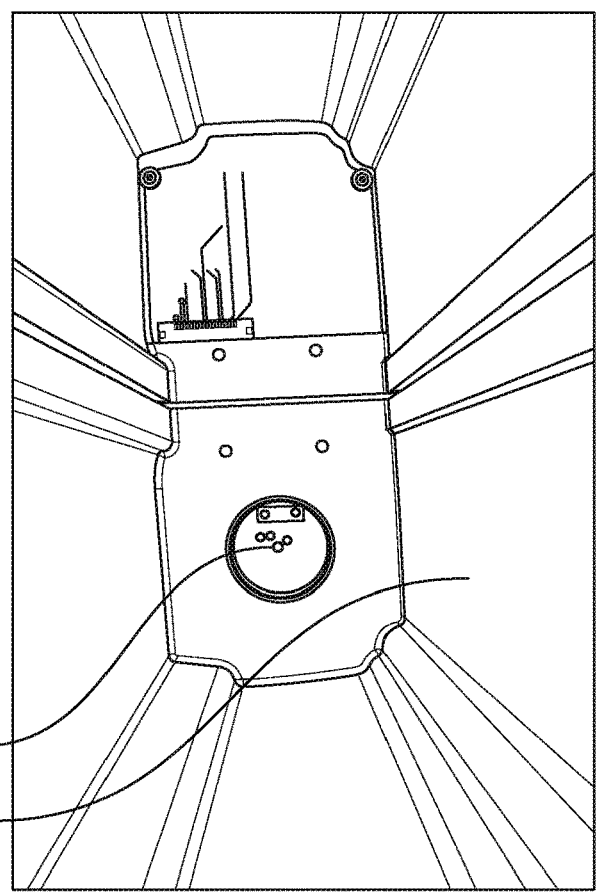
FIG. 8D is a perspective view of the interior of the module housing of FIG. 8A.
Figure 8C:
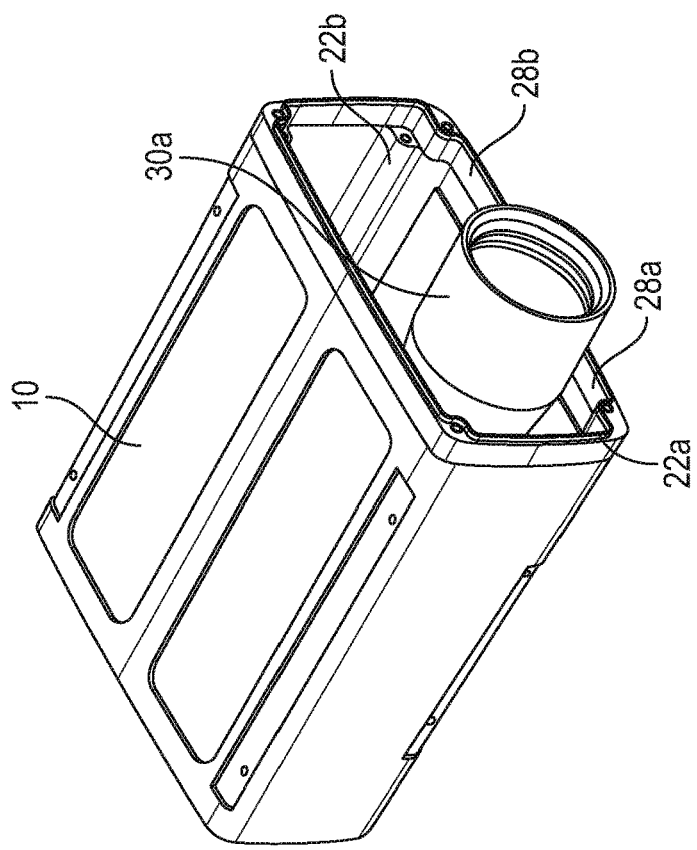
FIG. 8C is a perspective view of the module housing of FIG. 8A.
Figure 8E:
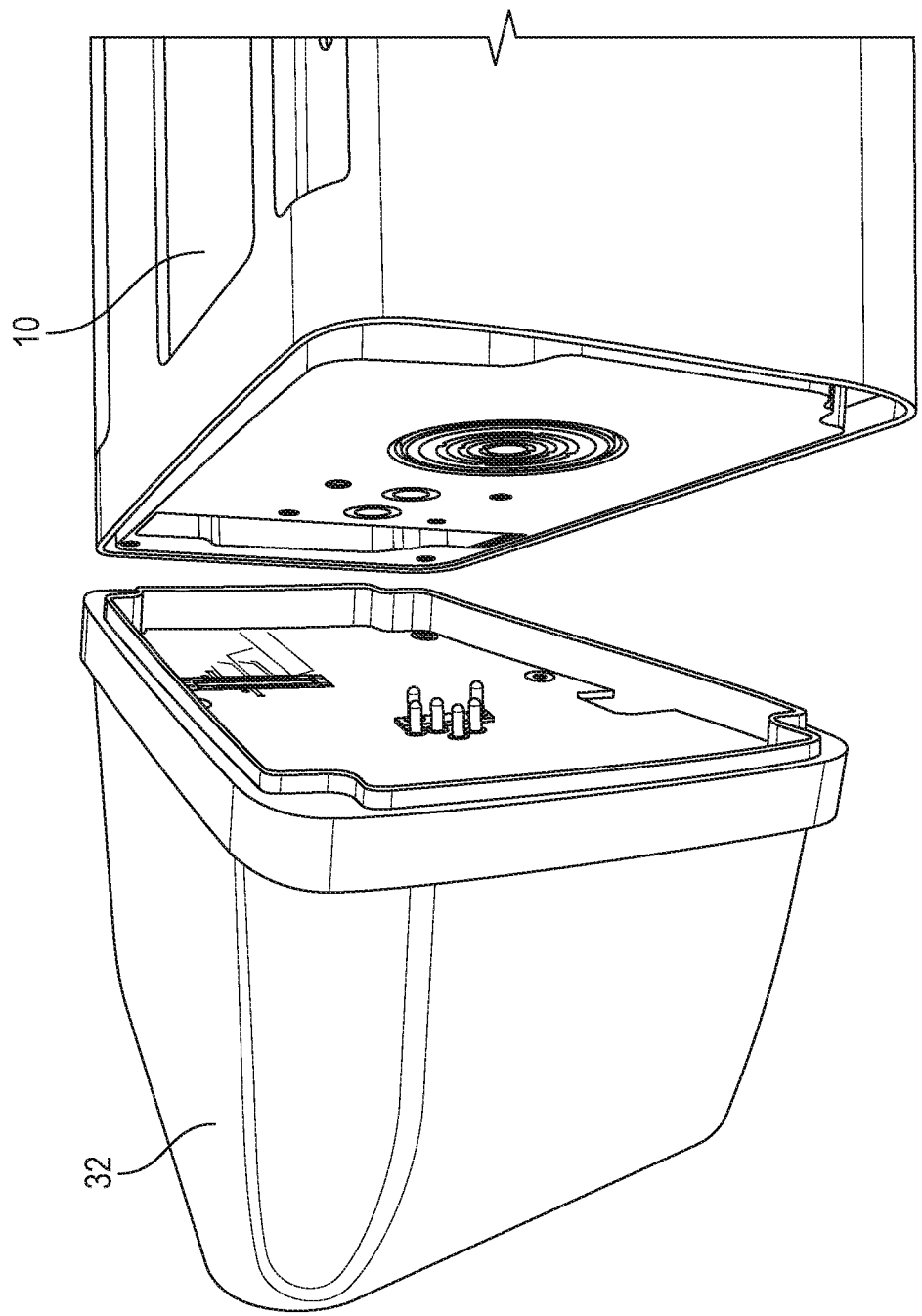
FIGS. 8E & 8F are perspective views of the module housing of FIG. 8A and a master module.
Figure 8F:
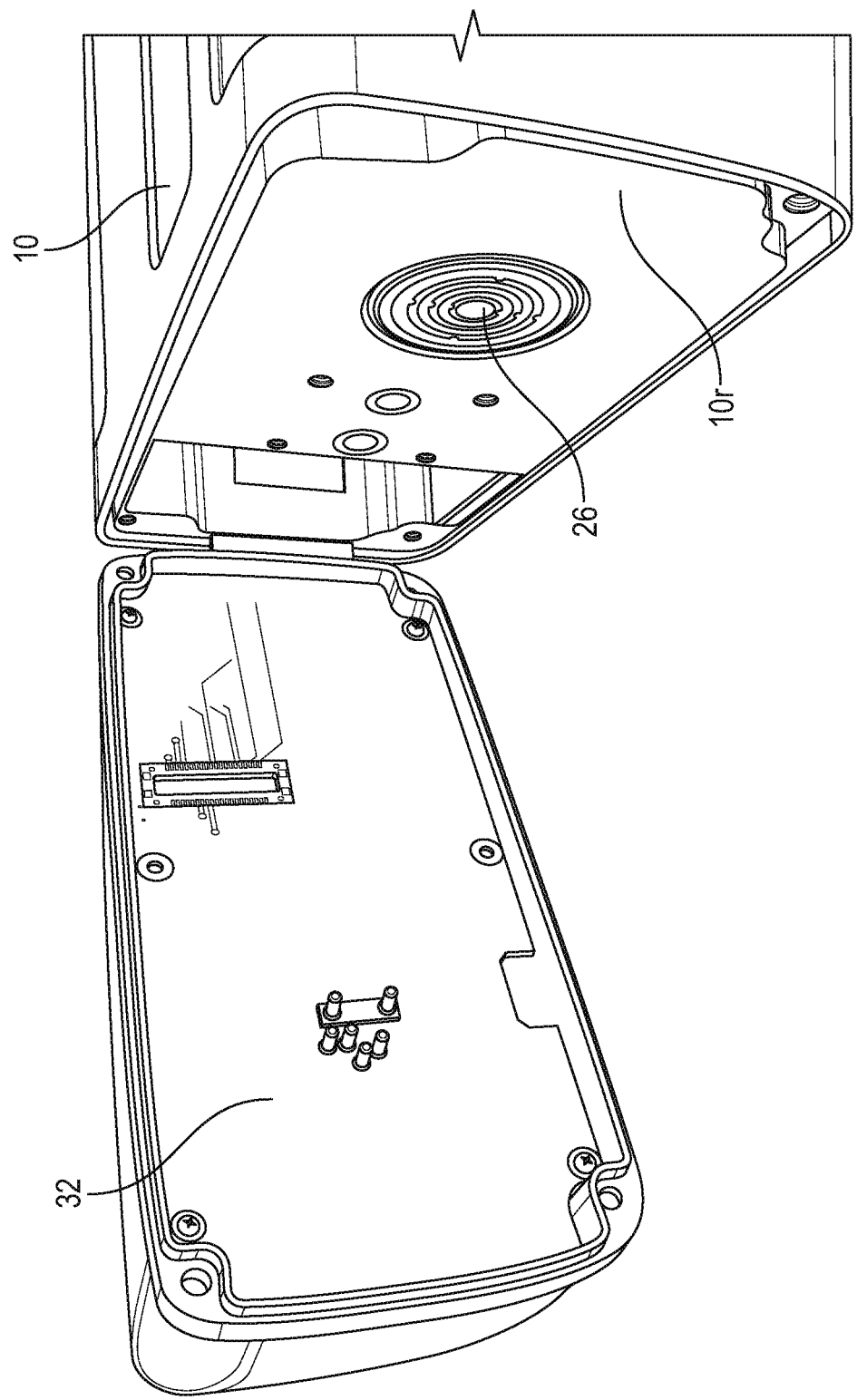
Figure 8G:
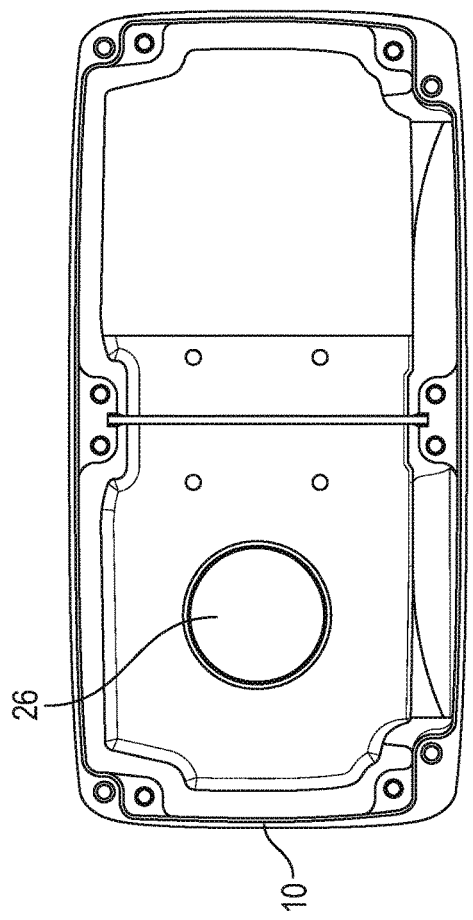
FIG. 8G is a front view of the module housing of FIG. 8A.
Figure 8H:
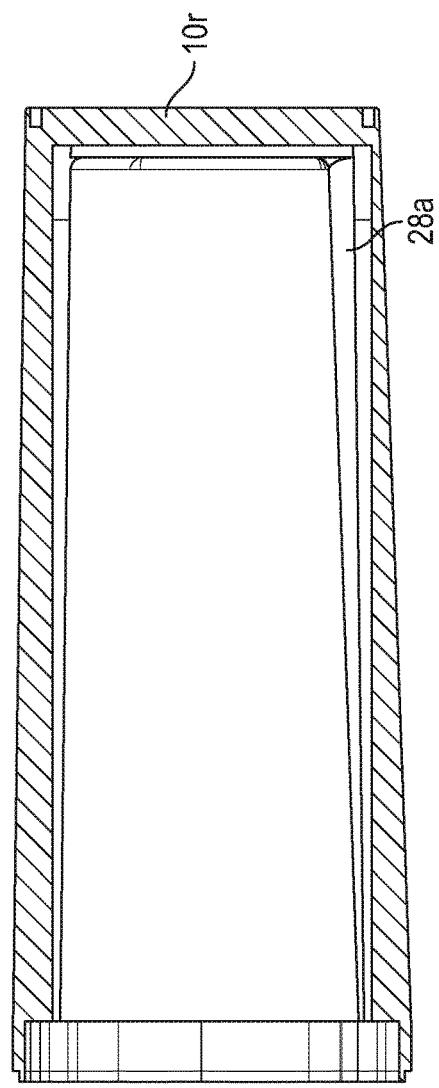
FIG. 8H is a cross-sectional view of the module housing of FIG. 8A.
Figure 9C:
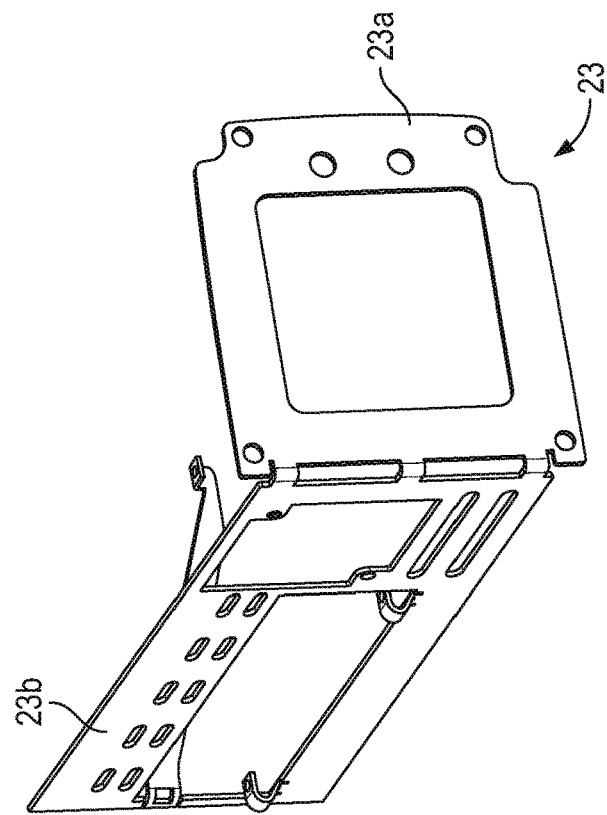
FIG. 9C is a perspective view of the chassis of FIG. 9A.
Figure 9A:
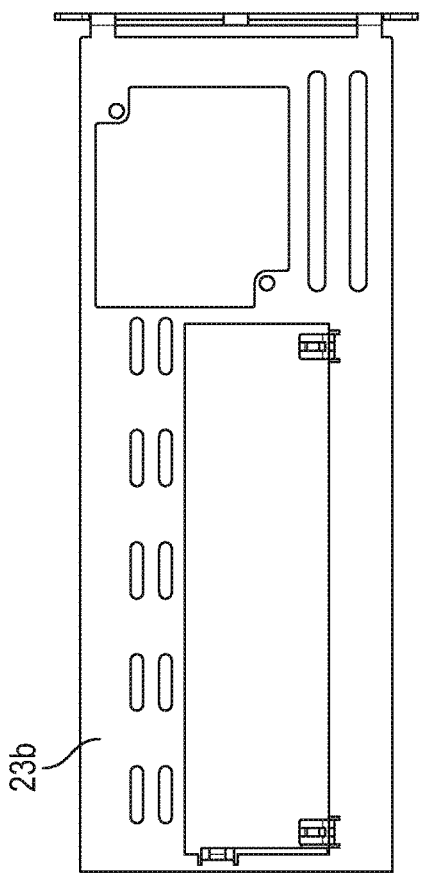
FIG. 9A is a side view of an internal chassis.
Figure 9B:
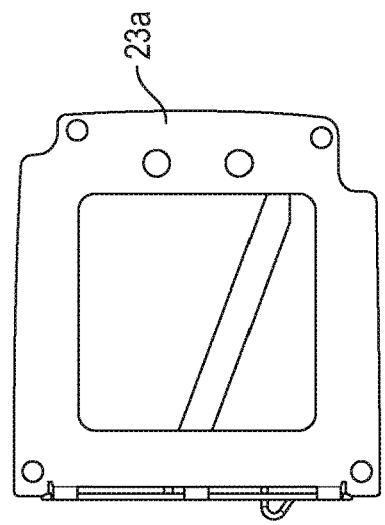
FIG. 9B is a front view of the chassis of FIG. 9A.
Figure 9E:
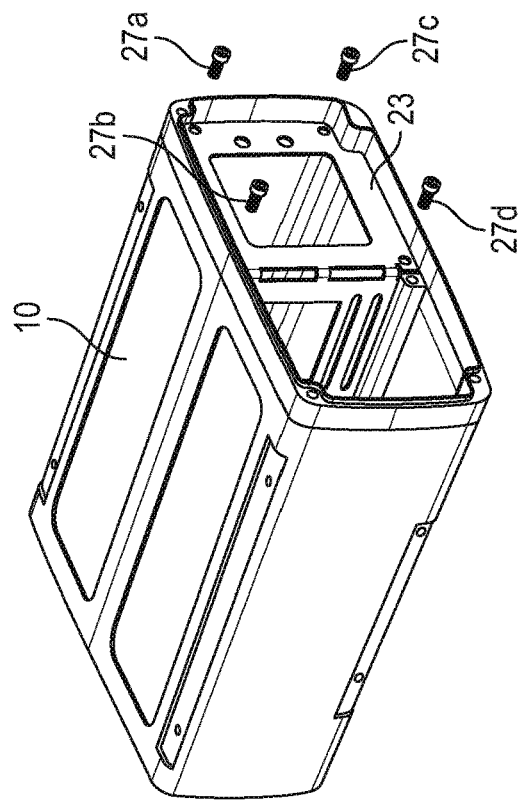
FIGS. 9D-9F show perspective views of the chassis of FIG. 9A being inserted into the module housing of FIG. 8A.
Figure 9D:
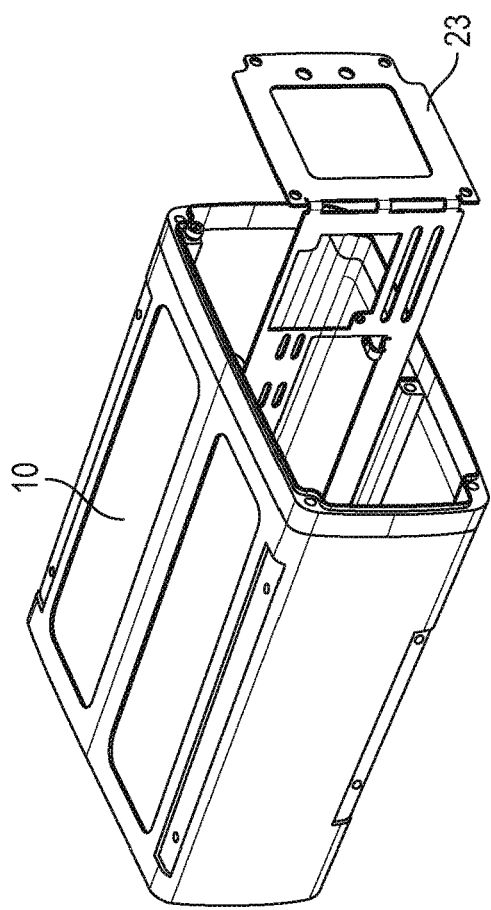
Figure 9F:
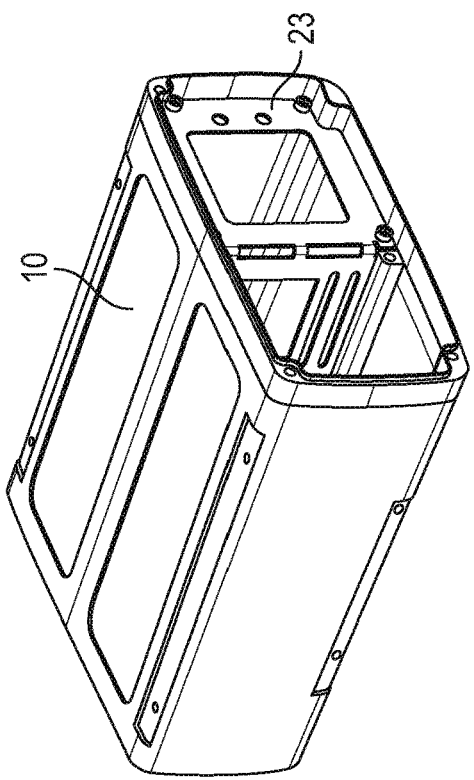

As noted above, the module housing 10 can include one or more slots 22a, 22b sized and configured to receive various modules 30a-30n, as shown in FIGS. 8A-8C for example. The module housing 10 can be designed to permit the modules 30a-30n to be received by slots 22a, 22b in the housing module 10. Grooves 28a, 28b can be formed in an interior of the housing 10 to provide a sliding slot for the modules 30a-30n, so the modules can easily be fixed in the housing 10. A module 30 can be slid into the housing slot 22 directly, guided by the grooves 28a, 28b of the housing 10. A rearward end of the module housing 10r can provide for an opening 26 which permits the module 30a to interface with a master module, as shown in FIGS. 8D-8F. In one embodiment, the connection between the module 30a and the master module 32 can be the same as discussed above with respect to FIGS. 5A & 5B. When the module 30a-30n is slid in, the module, or a chassis 23 is fixed to the module housing 10 by multiple fasteners, such as bolts 27a-d, shown for example in FIG. 9E. The modules 30a-30n can alternatively be fixed by a click mechanism (with a latch and hook) or a magnetic fixation for keeping it in place. A chassis 23 can also be provided within the module housing 10, providing rails and grooves in the within the module housing 10, as shown in FIGS. 9A-9E. The chassis 23 can generally have a front faceplate 23a and a side frame member 23b. The faceplate 23a can be generally perpendicular to the frame member 23b. The front faceplate 23a can include a plurality of through holes for securing the module 30a-30n to the chassis 23 and the chassis 23 to the frame 10. As shown, for example in FIGS. 9D-9F, the chassis 23 can be slid into the frame 10 until the front face 23a is disposed proximate the front face of the frame 10.

The following paragraphs outline various modules 30 which are envisioned to be used with the present modular device 100. This listing is intended to be merely descriptive and not exhaustive of the possible modules which can be used. The various modules 30 can be used in any combination, or alone, as outlined below.

Master Control Module

A single master control module 32 can be able to propagate and control a network of modules 30 of which it is the master towards other modules 30a-30n. For example, the master control module can determine the behavior of the specific combination of modules 30a-30n present in the device 100. The master 32 can distribute commands and firmware updates over its network and receive status information. The master control module 30 can have the task to communicate with the user through an application, in which the user can change settings of the modules 30 and receive detailed information on the status of the modules 30. The master control module 32 can have an upgrade slot, as noted above, so small modules can be added for extra functionality of the device 100. For example, space is reserved in the module housing 10 and on the PCB to mount this module. The slot provides the same standardized connection bus as all other modules.

Operator Control Module

An operator control module 50 (usually a phone, tablet or laptop) can be used to connect to the device 100 and change device settings or push firmware updates. When an operator control module is attached to the device 100 by means of a wired (on the bus, USB, or other) connection or wireless (Bluetooth, WiFi, LoRa, 2G/3G4G/5G, Iridium), the master control unit 32 can act as a slave of the operator control unit. The operator control unit 50 can be used as a temporary control, only to set up the device or change settings. The device 100 can further operate autonomously on its own. The operator control module 50 can be attached to the device 100 with a wired connection or with a wireless connection.

Communications Module

The device 100 can be updated with a communications module in order to improve connectivity. The connections can be for example a 3G/4G/5G cellular network connection, but also a LoRa network, Bluetooth or WiFi. This communication module can be mounted externally to the device 100 in a separate box, or can be mounted inside the master control unit or in a module housing upgrade bay. Newer models may have this communication function build in, into the main PCB. The communications module can be used to remotely monitor the device 100 and change device settings by a distributor and/or by the end user. The communications module can additionally allow for remotely changing the device settings and providing firmware updates for the master control unit or any of the individual modules.

Laser Module

A laser module 30a consists of a laser light source, a control unit and a set of optical lenses. Exemplary embodiments of laser modules are shown in FIGS. 10A-10H. In one example, the light source of the laser can be a diode laser. A diode laser can, for example, also be a gas laser or other laser source. Other exemplary light sources may include a regular light source such as an LED, or other directable light source, or lightbulb. Lenses can be disposed on the light source and can be designed to expand the beam of the light source to a larger diameter beam. In case, a diode laser is used, an elliptical beam shape can be converted to a round beam with the use of cylindrical lenses. The control unit can process the communication with other device modules and controls the laser output power.

The laser module, as any other module where this is required, can use a 'heartbeat signal' in order to understand if its is still actively controlled. If the main controller 32 fails to communicate with the laser 30a within a certain amount of time the laser will turn itself off for safety reasons. The laser module 30a can additionally keep logs about itself. The amount of time the laser was on, the lowest and highest temperatures it experiences can be logged. Periodically the laser module 30a can log laser output intensity using the photodiode, the state it is in (laser on/off, . . . ) and temperature of several parts. The log will enable a user to understand what happened to a particular unit when it comes back for repair or when the laser is at the end of its life. When placing the device 100 in a dock or adapter, all the information from the logs can be retrieved for information, troubleshooting, return and repair and quality control purposes. Using these metrics, the laser can understand when it is not performing properly and communicate this to the main controller when asked about its status. The main controller 32 can act accordingly to inform the user about the situation. This log can be produced after a failure to produce laser output, or after an output which is deemed to low, or when the unit determines its output is deteriorating based on the compensation its needs to perform on its feedback loop. These metrics can be input to further understanding and data analysis in order to improve the algorithms inside the laser as well as quality control and predictive maintenance.

The laser module 30a can be designed as a lightbulb with a concentric thread connection 92 on the back of the laser 30a to make replacement and assembly easier. The mechanical interface from the laser module towards other modules is provided through a concentric threaded connection 91, for example M33×2 or equivalent. In general, the instant design overcomes the following problems with heat dissipation of the heat generated inside the module 30a (1), alignment of the laser module (2) and easy replacement of the laser module (3). The threaded connection resolves all the three challenges.

The screw thread connection 91 has a conducting surface area 93 touching the receiving thread 91 in the module housing 10 that is large enough to dissipate the heat built up 94a inside the laser module 30a. Another connection option is an interlocking click system or a bayonet mount that mounts the laser module in its place and connects a similar conducting surface area to the module housing 10. The module housing 10 is made of a thermally conductive material, e.g. aluminum copper, brass, steel etc., for optimal thermal conductivity and further heat dissipation 94c to the environment. Using the thermal mass of the module housing 10 removes the need for a separate heatsink or cooling system. With diode lasers, only a fraction of the required energy that is supplied to the laser driver can be transformed into visible laser light. The remaining part of that energy is converted into heat, which needs to be removed from the laser module. This permanent passive cooling system enables sufficient heat dissipation 94a-94c and does not require failure sensitive active cooling components such as fans, heat pumps or air conditioning units.

The second challenge, alignment of the laser module, is also resolved by both the screw thread 91 and the clicking system or bayonet mount. The screw thread connection 91 can allow the laser module to be positioned in only one orientation. The hole for the mechanical connections inside the module housing 10 can be manufactured from a mold to ensures that for each device, the laser module will be aligned in exactly the same way.

Without using a fixed connection for the laser, when the laser 30a is powered through power wires, the laser can still be switched on after physical displacement of the laser module inside the module housing 10. With respect to laser safety this introduces a risk, as the laser may no longer project in the predefined laser-controlled area, and exposure to hazardous laser radiation may be possible. With the concentric, coincident connection design, as shown in this issue is resolved. If the laser module is displaced within the module housing, it means that the module is unscrewed from the screw thread or released from its interlocking connections. If this is the case, then it will also not be in contact with the concentric connection pins and therefore the laser cannot be switched on after it has been displaced.

The third challenge, the need for easy replacement of the module, is resolved by the screw thread design 91, a bayonet coupling and a click coupling as the laser module can be replaced just as easily as replacing a common light bulb. No workshop, engineering skills or special tools are required. Anyone can perform this replacement, anywhere.

Heat transfer from the laser to the surroundings, occurs as indicated by reference characters 94a-94c. In general, heat is conducted to the metal body 93 of the laser module 30a. The diode housing can be made of brass for good heat conductivity. The housing of the laser module is made out of aluminum. The heat transfer through the laser module housing shown with reference character 94b. The laser module 30a can release its heat via the threaded connection 91 in the back. The heat will transfer to the module housing (or the before mentioned laser adapter). The module housing is in contact with the outside environment and can release its heat into the surrounding air 94c, 94c.

Alternatively, it is also possible to configure for example a handheld device from the laser module. When the laser module is connected via the concentric connection 97 to another device which provides adequate power from a battery and provides the right data connection to the laser module 30a, a handheld portable laser torch is created. In this way, with the lightbulb like connection, multiple devices can be configured with the same laser module.

Figure 10A:
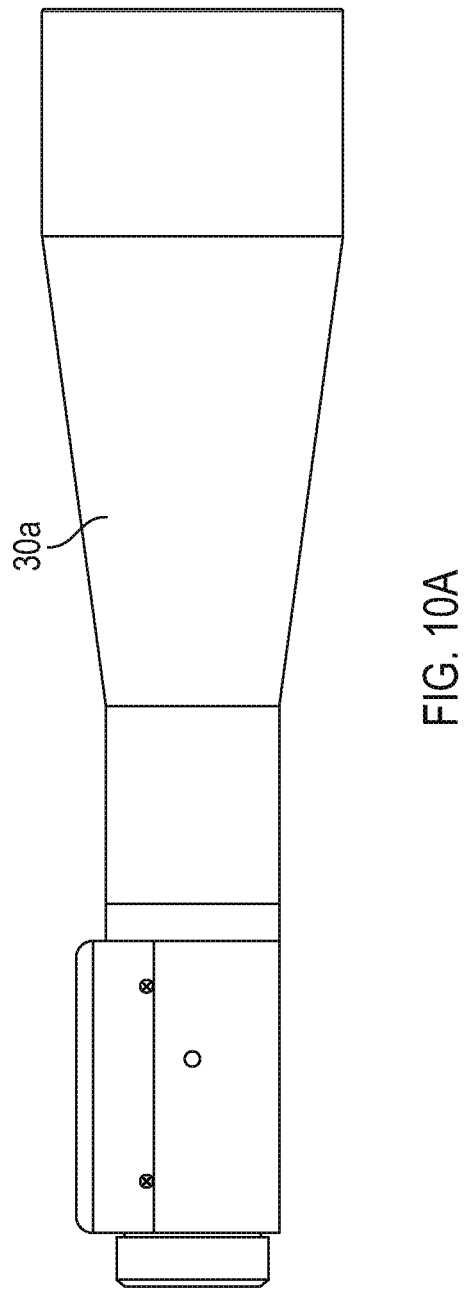
FIG. 10A is a side view of an exemplary laser module.
Figure 10C:
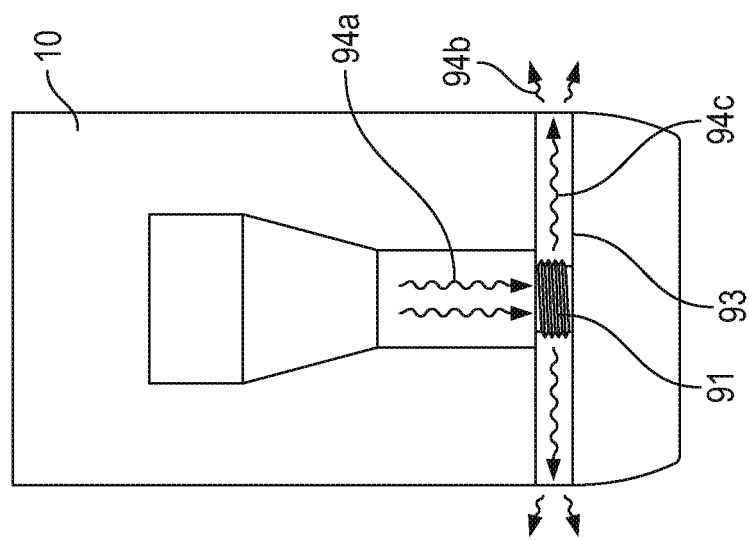
Figure 10D:
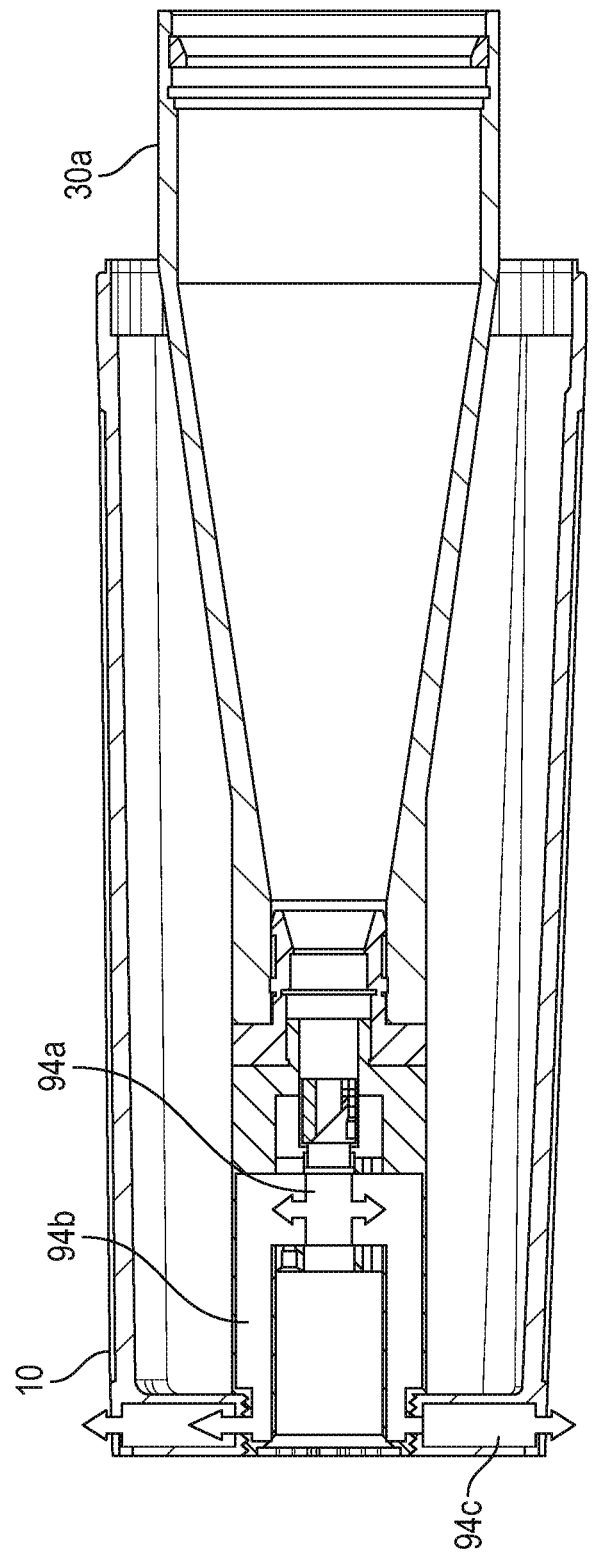
Figure 10E:
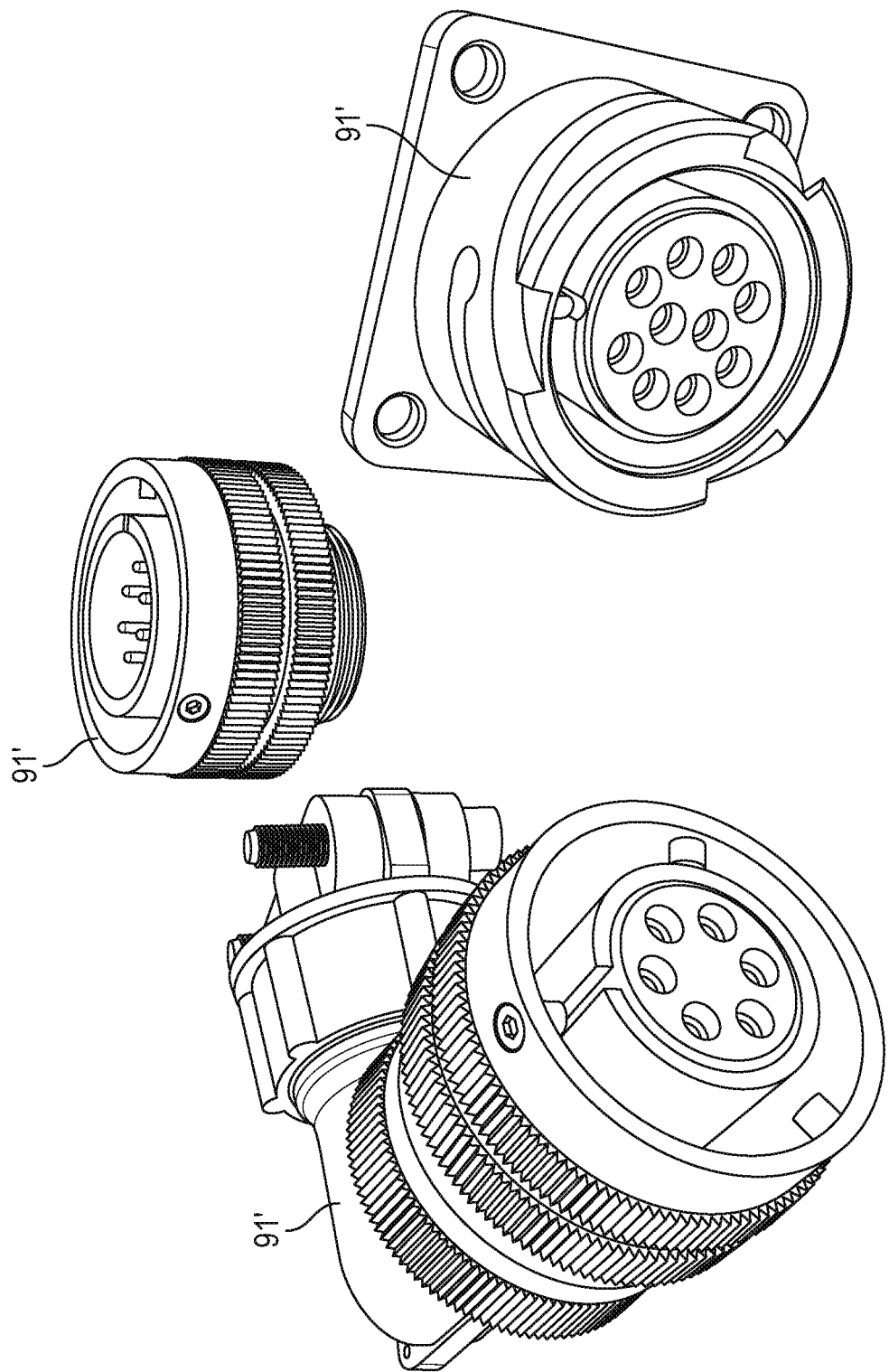
FIG. 10E shows an exemplary connector for the laser module of FIG. 10A.
Figure 10F:
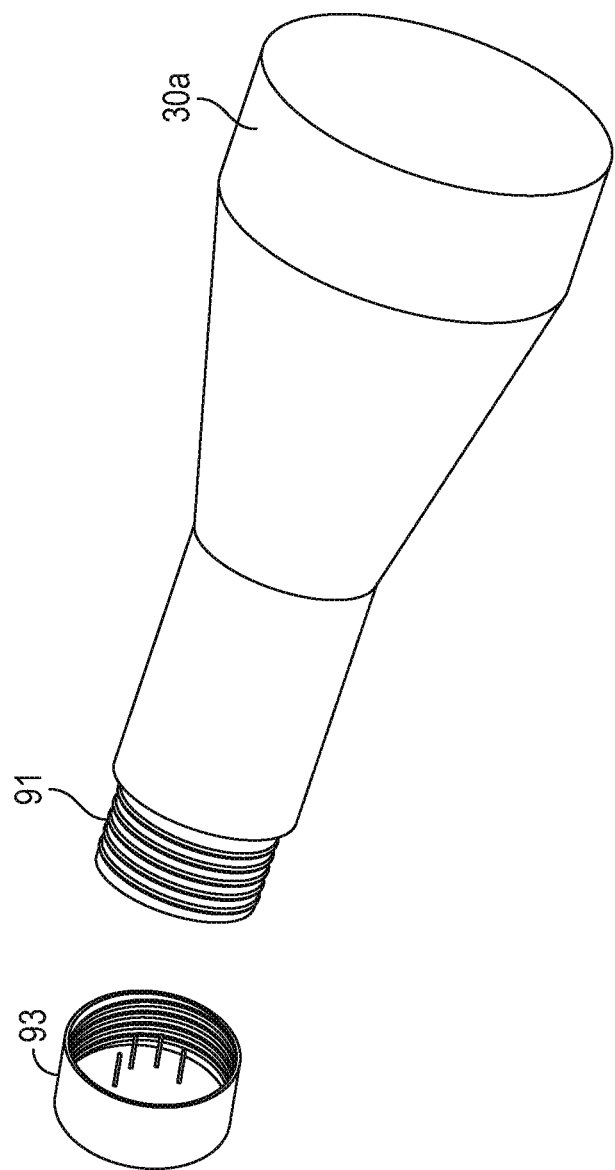
FIGS. 10F-10H shows an exemplary connector for the laser module of FIG. 10A.
Figure 10H:
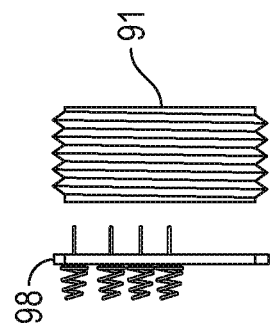
Figure 10G:
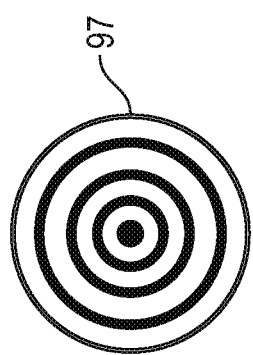

Several means of establishing a quick and easy connection between the laser and connecting (main)module are with a screw thread 91, which allows the laser to be screwed in place just like a lightbulb. A bayonet coupling 91', as shown in FIG. 10E uses a circular coupling which consists of one or more pins on the male connector, which slide into L-shaped slots on the female connector when the connector is twisted. Making this coupling out of metal creates the same advantages of heat dissipation, alignment of the laser and easy replacement. Additionally, a click coupling, consisting of a latch and a hook which automatically connect together when plugged into each other, can be an additional alternative coupling. A laser module 30a which does not have the thread 91 but does center inside the hole, connects to the contacts, in the back but is mounted and fixated on the front side is also a possibility.

The electrical interface between the laser module and the system is composed of a electrical circuit 97 comprised of concentric circular rings on the laser module which mate with a contact 98 (spring loaded contacts, pogo pins) on the connecting (main)module, oriented such that each of them (or multiple for better connection reliability and pass through of power) connects with one of the rings in order to propagate power and communication towards and from the laser module. The connecting pins could also be part of the laser module with the ring contacts on the connecting (main)module.

Inside the laser module can be a sensor that measures laser output. This sensor can be a photodiode, but alternatively, it could also be a photoresistor (LDR). The sensor can measure the light output produced by the laser diode because a fraction of the beam is split off and falls on the sensor. The relationship between the photodiode signal, the setpoint from the controller and the actual measured optical output is taught using a calibration procedure. This relationship is unique for every laser unit. This procedure is done using a calibration setup comprising of an adapter, laser module, a calibrated optical output sensor (power sensor) and a computer running a calibration program. This program can communicate with the laser unit as well as an optical sensor and thus creates a closed loop in order to (automatically) perform a calibration. The photodiode signal can be fed back into the microcontroller to keep the beam stable and to regulate to the setpoint. This information can be passed along to other modules to, for example, make a status indicator light change color or send a signal to the user to replace the laser component when the runoff from the setpoint becomes too high. The output sensor can additionally be used for controlling the laser output. The laser diode is generally very sensitive to temperature changes, which means the laser output will change when the temperature changes. The laser output sensor can measure the real laser output, which is then used to increase or decrease the power to the laser diode, to compensate for (amongst others) the temperature changes. The laser module can store benchmark data regularly for a user to learn from the product and provide areas for improvement of the product. The laser module can additionally store laser burn hours, light intensity and temperature data internally. By plugging the laser 30a into an adapter 80, this data can be read by an operator. Based on this data, prediction models can be made for the lifetime of the laser modules.

Emergency Module

An emergency module 45 can be a module with a status indication light, an emergency button and sometimes a keylock switch on request or when required by law. The emergency module 45 has a similar connector to the actuator unit 25 mentioned above; the wiring is fed through the module in similar fashion as well. This module is able to switch (on and off) the main power lines going into the system, ensuring that the motorized unit and the laser are both shutdown in case of an emergency. The status indication light and keylock switch can add functionality required either for safety standards or for user convenience. In cases where multiple emergency modules are required (e.g. a large industrial building where the device is arraigned on top of the roof, but the floor manager wants to be able to shut it down from within the building as well as from the staircase leading up to the roof) multiple modules 45 can be connected in series. Because the multiple modules pass through the electrical wiring, they are all able to communicate with the master control module. This configuration allows for all of the modules to display the same information, regardless of the place they are installed.

The emergency module 45 can act as a slave of the master control unit within the system. The status indicating light can be set to a color as the master control unit sends this signal. However, an operator is able to switch off the main power from the whole system by pressing the emergency button (e-stop) on the emergency module. The main power to the rest of the system is then immediately switched off preventing any laser output and preventing any movement of the motor platform. In such a case, the secondary power can remain active to allows the micro-controllers of the individual modules to still send status updates when requested by the master control unit. The master control unit still keeps its time and its settings. When the system is then turned back on again, the device can immediately continue operating normally.

Camera Module

A camera module, not shown, can for example consist of a digital camera that is able to communicate separate images or a continuous stream of images via the communication module towards an operator control module. The camera module can allow a professional to remotely configure the machine and remotely monitor the system behavior by visually inspecting the results. The camera module can also store environmental parameters. The camera module can be fitted with different types of CMOS, CCD or thermal sensors that operate at different wavelengths, depending on what suits the application. For example, a full-color or black and white camera that operates in the visible light spectrum can be used for remote configuration and monitoring by an operator. A sensor that captures an ultraviolet image can be used for determining and storing environmental parameters. A LWIR, MWIR or SWIR thermal sensor can be used to more easily discover living animals or humans in the scene. Alternatively, or in addition, a CMOS or CCD sensor that includes the infrared spectrum can be used for night vision. The camera module provides the possibility for the system to adapt to its surroundings and increase its efficiency and ease-of-use.

Radar Module

A radar module that can detect moving objects in its environment by using a doppler effect radar. The radar module may, for example, detect objects in the area and recognize birds by walking characteristics or the characteristics of birds flapping their wings. This information can then be used to improve the bird dispersal function of the system or for other activities which require bird detection. A radar module may be used to scan a broader and larger area for bird activity both on the ground and in the sky.

Sensor Module

A sensor module 44 for the device can be provided. The sensor module can either be mounted externally to the device or internally in the upgrade bay. The sensor module can contain any sensors that measure environmental parameters, like temperature, humidity, rainfall, GPS position, sound, air density, wind speed, magnetic field (direction), light intensity (and color), fire detector, air quality meter, air pollution meter, etc. For example, in agricultural situations it can be beneficial to install a sensor module which measures weather data, so the farmers can monitor weather parameters for their crops, as well as dispersing birds with only one device. Another example might be to install an air pollution meter on a dispersal system nearby to an airfield, so authorities can measure the air pollution in the surrounding area. A sensor module is a module that expands the possibilities of the system and increases the versatility of the device. The platform of the system might also be used to only connect a network of sensors together, in order to monitor weather or other environmental parameters.

Monitoring/Remote Control Module

One or multiple devices 100 can be connected to the monitoring module 50. This control module can read and possibly store various status updates from all devices and and modules that are connected. An operator is then able to monitor all connected devices from one single location. The monitoring module 50 can also be equipped with a wireless or cellular network connection, so the operator can receive a push notification when one of the units reports an error.

An expansion of the monitoring module 50 can be a remote control, to let the operator remotely turn on and off the device. Multiple devices 100 can be connected to a single monitoring/remote control module. This allows for the setup of a central control room for a group of connected devices, as discussed above. A monitoring module/control module 50 can for example be used at an airport, where it is critical to be able to immediately shut down the laser devices when there is an emergency situation or a critical device error. Alternatively, it is considered that at large farms with multiple laser devices it is possible to remotely shut down the devices that project onto a certain part of the field.

As noted above, one advantage to the current system is the ability of the modular device 100 to receive and work with new components as technology advances or the needs of the user change, for example the modules listed above. The universal module interface enables products to be created by connecting a set of standard modules. One of the main advantages is that development efforts in one module will immediately benefit all the products that feature this module. Moreover, documentation, bug fixing and service can be tackled more efficiently as the total number of modules throughout the company product range that are developed and maintained will be strongly reduced.

Examples of different module combinations are:

A laser module, master control module, and a battery tube can be networked together to form a handheld laser device (not shown). A handheld laser device can be used for dispersing birds by means of a laser. The laser can then be used like a flashlight. The laser beam can be then directed by hand.

A master control module, a laser module, an emergency module, and a power supply module can be combined to create a static laser bird deterrent.

A master control module, a laser module, an actuation module, an emergency module, and a power supply module can be configured to form an autonomic laser bird deterrent. In this configuration the resultant device can automatically play a pre-installed pattern following a certain set of rules and settings. By projecting on a field or surface, the repeated projection of the laser has a deterring effect on birds.

A master control module, camera module, actuation module, emergency module, and power supply module can be combined to form a detection system for birds/animals. Such a configuration can be able to scan an area and detect birds/animals in this area. This data can then be used for gathering bird data. The data can then be used for determining a strategy for more optimal bird deterring. The data can also be used for gathering data about bird locations/amounts/behavior for research purposes.

A master control module, laser module, actuation module, emergency module, power supply module, and camera module can be combined to form an autonomic automatic bird deterrent. This system configuration can use the camera data to deter birds from an area. The camera can scan the area for bird hotspots, which are spots with bird presence. The camera data can then be used to direct a laser beam towards a bird hotspot. The system can then check if the laser projecting was effective and project more often on a hotspot when the first tries were ineffective. When no birds are present, the camera will keep scanning and the system turns the laser off. As birds appear in the area, the system can turn on the laser and start deterring again.

A master control module, laser module, actuation module, emergency module, power supply module, and connectivity module can be combined to form an autonomic bird deterrent with remote connectivity. Adding a connectivity module to the system allows it to communicate through cable or via wireless connection with other devices. The system can then be monitored remotely. Changing settings remotely is also an option. Connectivity also allows for connecting multiple modules together to form a kind of network.

A laser module, master control module, actuation module, emergency module, power supply module, and camera module can be combined to form an alternative autonomic automatic bird deterrent with connectivity. This combination can provide an automatic and autonomic bird deterrent system with connectivity as described earlier.

The autonomic laser bird deterrent system can be combined with a sensor module to form an upgraded autonomic bird deterrent. A sensor module can be added to any system configuration in order to expand functionality. Different types of sensors can provide a wide variety of added functionality, depending on what certain customers want. The sensor module can for example monitor weather parameters to be used by farmers.

Having thus described certain particular embodiments of the invention, it is understood that the invention defined by the appended claims is not to be limited by particular details set forth in the above description, as many apparent variations thereof are contemplated. Rather, the invention is limited only be the appended claims which include within their scope all equivalent devices or methods which operate according to the principles of the invention as described.

What is claimed is:

1. A modular bird deterrence device comprising:
   a housing;
   a scanning actuator obtaining a sequence of successive images;
   at least one power source;
   a master control module;
   at least one slave module connected to the master control unit;
   wherein the master control module receives and processes said successive images using background subtraction to provide instructions to the at least one slave module and said scanning actuator to position said housing, and
   wherein the at least one slave module and said scanning actuator are is configured and arranged to operate independently upon receiving a command from the master control module.

2. The device of claim 1, wherein the at least one slave module is a light source module.

3. The device of claim 2, wherein the light source module is received in the housing with a threaded connector.

4. The device of claim 3, wherein the light source module is housed within a light source module housing having at least two heat sinks.

5. The device of claim 1,
wherein the at least one slave module is at least two modules, and
wherein one of the at least two modules is a light source module.

6. The device of claim 5, wherein the other of the at least two modules is one of a camera module, a radar module, and a sensor module.

7. The device of claim 1, wherein the at least one slave module includes a connector having at least two independent power connections and one communication connection.

8. A bird deterrence device comprising,
a housing, the housing including:
   a top side portion;
   two side portions extending downward from the top portion on opposite sides thereof;
   a rear face portion extending from the top portion and disposed between the two side portions; and
   a bottom side portion disposed below the top side portion, the bottom side portion having an upward facing surface which includes at least two grooves extending there in from a front face of the housing towards the rear face portion,
a master controller disposed on the housing;
a scanning actuator to obtain a sequence of successive images position said housing configured and arranged to operate independently upon receiving a command from the master control module based on processing of said successive images using background subtraction; and
at least one slave unit disposed in the housing and received within one of the at least one grooves.

9. The device of claim 8, wherein the rear face portion includes at least one opening to permit an electrical connection between the at least one slave unit and the master controller.

10. The device of claim 8, wherein the at least one slave unit is received in a chassis, the chassis is configured to be slidably received in one of the at least two grooves of the housing.

11. The device of claim 8 further comprising,
a primary power source,
a secondary power source, and
an emergency stop module which is configured and arranged to provide power from both the primary and secondary power source to the at least one slave unit in a first configuration and, configured and arranged to provide power only from the secondary power source in a second configuration.

12. The device of claim 8, wherein the device is configured and arranged to have a second slave unit configured and arranged to directly interface and function with the master control unit.

13. The device of claim 8, further comprising a wireless communication module and a wireless operator control module,
wherein the wireless operator control module is configured and arranged to function as a master controller over the master control unit.

14. The device of claim 8, wherein the at least one slave module is a laser module.

15. The device of claim 14, wherein the laser modules is received in the housing with a threaded connector.

16. The device of claim 15, wherein the laser module is housed within a laser module housing having at least two heat sinks.

17. The device of claim 8,
wherein the at least one slave module is at least two modules, and
wherein one of the at least two modules is a laser module.

18. The device of claim 17, wherein the other of the at least two modules is one of a camera module, a radar module, and a sensor module.

* * * * *